United States Patent
He et al.

(10) Patent No.: US 10,789,229 B2
(45) Date of Patent: Sep. 29, 2020

(54) DETERMINING A HIERARCHICAL CONCEPT TREE USING A LARGE CORPUS OF TABLE VALUES

(71) Applicant: Microsoft Technology Licensing, LLC, Redmond, WA (US)

(72) Inventors: Yeye He, Redmond, WA (US); Kris K. Ganjam, Redmond, WA (US); Keqian Li, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 516 days.

(21) Appl. No.: 15/621,767

(22) Filed: Jun. 13, 2017

(65) Prior Publication Data

US 2018/0357262 A1    Dec. 13, 2018

(51) Int. Cl.
*G06F 16/00* (2019.01)
*G06F 16/22* (2019.01)
*G06F 16/28* (2019.01)

(52) U.S. Cl.
CPC ...... *G06F 16/2246* (2019.01); *G06F 16/2282* (2019.01); *G06F 16/282* (2019.01); *G06F 16/285* (2019.01); *G06F 2216/03* (2013.01)

(58) Field of Classification Search
None
See application file for complete search history.

(56) References Cited

U.S. PATENT DOCUMENTS

| | | | |
|---|---|---|---|
| 6,098,033 A | 8/2000 | Richardson et al. | |
| 6,411,962 B1 | 6/2002 | Kupiec | |
| 7,139,973 B1 * | 11/2006 | Kirkwood | G06F 16/9574 715/206 |
| 7,392,174 B2 | 6/2008 | Freeman | |
| 7,835,578 B2 | 11/2010 | Cheng et al. | |
| 8,180,760 B1 * | 5/2012 | Carver | G06F 16/355 707/708 |
| 8,271,453 B1 | 9/2012 | Pasca et al. | |
| 8,280,719 B2 | 10/2012 | Miller | |

(Continued)

FOREIGN PATENT DOCUMENTS

EP    1288794 A1    3/2003

OTHER PUBLICATIONS

Matsuo, et al., "Keyword Extraction from a Single Document using Word Co-occurrence Statistical Information", In Proceedings of the Sixteenth International Florida Artificial Intelligence Research Society Conference, May 12, 2003, pp. 392-396.

(Continued)

*Primary Examiner* — Son T Hoang
(74) *Attorney, Agent, or Firm* — Schwegman Lundberg & Woessner, P.A.

(57) ABSTRACT

A table corpus processing server identifies concepts within enterprise domain data. The table corpus processing server is configured to iteratively group values in a table corpus based on co-occurrence statistics to produce a candidate hierarchical tree. The candidate hierarchical tree is then summarized by selecting nodes that can best "describe" the original corpus, which leads to a small tree that often corresponds to desired concept hierarchies. The table corpus processing server employs a parallel dynamic programming approach that allows the disclosed embodiments to scale with amount of enterprise domain data being analyzed.

20 Claims, 12 Drawing Sheets

(56) References Cited

U.S. PATENT DOCUMENTS

| | | | |
|---|---|---|---|
| 8,630,989 | B2 | 1/2014 | Blohm et al. |
| 9,037,452 | B2 | 5/2015 | Fan et al. |
| 9,208,221 | B2 | 12/2015 | Gallivan |
| 9,268,844 | B1* | 2/2016 | Kadarkarai ............ G06F 16/35 |
| 2009/0276446 | A1* | 11/2009 | Graf ...................... G06F 16/258 |
| 2011/0022598 | A1 | 1/2011 | Pennacchiotti et al. |
| 2016/0063043 | A1* | 3/2016 | Carroll ................... G06F 16/25 707/797 |
| 2016/0259847 | A1 | 9/2016 | Fliri et al. |

OTHER PUBLICATIONS

Zhang, et al., "Discovering Relations Between Named Entities from a Large Raw Corpus Using Tree Similarity-Based Clustering", In International Conference on Natural Language, Oct. 11, 2005, pp. 378-389.

Agichtein, et al., "Snowball: Extracting relations from large plaintext collections", In Proceedings of the fifth ACM conference on Digital libraries, Jun. 2, 2000, pp. 85-94.

Auer, et al., "DBpedia: A Nucleus for a Web of Open Data", In Proceedings of the 6th international the semantic web and 2nd Asian conference on Asian semantic web conference, Nov. 11, 2007, 14 pages.

Benjelloun, et al., "Swoosh: a generic approach to entity resolution", In International Journal on Very Large Data Bases, vol. 18, Issue 1, Jan. 2009, pp. 1-20.

Bernstein, et al., "Generic schema matching, ten years later", In Proceedings of the VLDB Endowment, vol. 4, No. 11, Aug. 29, 2011, pp. 695-701.

Bollacker, et al., "Freebase: a collaboratively created graph database for structuring human knowledge", In Proceedings of the ACM SIGMOD international conference on Management of data, Jun. 9, 2008, pp. 1247-1249.

Cafarella, et al., "Webtables: exploring the power of tables on the web", In Proceedings of the VLDB Endowment, vol. 1 Issue 1, Aug. 2008, 12 pages.

Carlson, et al., "Toward an architecture for never-ending language learning", In Proceedings of the Twenty-Fourth AAAI Conference on Artificial Intelligence, vol. 5, Jul. 11, 2010, 8 pages.

Chierichetti, et al., "Correlation Clustering in Mapreduce", In Proceedings of the 20th ACM SIGKDD international conference on Knowledge discovery and data mining, Aug. 24, 2014, pp. 641-650.

Dalvi, et al., "Websets: Extracting sets of entities from the web using unsupervised information extraction", In Proceedings of the fifth ACM international conference on Web search and data mining, Feb. 8, 2012, pp. 243-252.

Deng, et al., "Scalable column concept determination for web tables using large knowledge bases", In Journal of the VLDB Endowment, vol. 6 Issue 13, Aug. 2013, pp. 1606-1617.

Grunwald, Peter D., "The minimum description length principle", In Publication of MIT press, Mar. 2007, 20 pages.

Etzioni, et al., "Unsupervised named-entity extraction from the web: An experimental study", In Journal of Artificial intelligence, vol. 165, Issue 1, Jun. 2005, pp. 1-42.

He, et al., "SEISA: set expansion by iterative similarity aggregation", In Proceedings of the 20th international conference on World wide web, Mar. 28, 2011, pp. 427-436.

Lee, et al., "Intelliclean: A knowledge-based intelligent data cleaner", In Proceedings of the sixth ACM SIGKDD international Conference on Knowledge Discovery and Data Mining, Aug. 1, 2000, pp. 290-294.

Li, et al., "Discovering concepts using large table corpus", https://www.cs.ucsb.edu/~klee/papers/c4.pdf, Retrieved on: Dec. 5, 2016, 11 pages.

Lin, et al., "Concept discovery from text", In Proceedings of the 19th international conference on Computational linguistics, Aug. 24, 2002, 7 pages.

Miller, George A., "Wordnet: A Lexical Database for English", In Proceedings of Communications of the ACM, vol. 38, Issue 11, Nov. 1995, pp. 39-41.

Ponzetto, et al., "Deriving a large scale taxonomy from wikipedia", In Proceedings of Association for the Advancement of Artificial, vol. 7, Jul. 22, 2007, pp. 1440-1445.

Quercini, et al., "Entity discovery and annotation in tables", In Proceedings of the 16th International Conference on Extending Database Technology, Mar. 18, 2013, pp. 693-704.

Rastogi, et al., "Finding connected components in map-reduce in logarithmic rounds", In Proceedings of 29th IEEE International Conference on Data Engineering, Apr. 8, 2013, 16 pages.

Ritze, et al., "Profiling the potential of web tables for augmenting cross-domain knowledge bases", In Proceedings of the 25th International Conference on World Wide Web, Apr. 11, 2016, pp. 251-261.

Suchanek, et al., "Yago: A Core of Semantic Knowledge", In Proceedings of the 16th international conference on World Wide Web, May 8, 2007, 39 pages.

Tao, et al., "Leveraging Pattern Semantics for Extracting Entities in Enterprises", In Proceedings of the 24th International Conference on World Wide Web, May 18, 2015, 30 pages.

Tran, et al., "Ontology-based interpretation of keywords for semantic search", In Proceedings of the 6th international The semantic web and 2nd Asian conference on Asian semantic web conference, Nov. 11, 2007, 14 pages.

Wang, et al., "Concept expansion using web tables", In Proceedings of the 24th International Conference on World Wide Web, May 18, 2015, pp. 1198-1208.

Wang, et al., "Iterative set expansion of named entities using the web", In Proceedings of Eighth IEEE International Conference on Data Mining, Dec. 2008, 6 pages.

Wu, et al., "Probase: A probabilistic taxonomy for text understanding", In Proceedings of the 2012 ACM SIGMOD International Conference on Management of Data, May 20, 2012, pp. 481-492.

* cited by examiner

DETERMINING A HIERARCHICAL CONCEPT TREE USING A LARGE CORPUS OF TABLE VALUES

TECHNICAL FIELD

Example embodiments of the present application generally relate to determining a hierarchical concept tree using a large corpus of table values and, in particular, to using a dynamic programming approach to determine a hierarchical concept tree that is a solution to a concatenated subtree selection with a height constraint problem, where the hierarchical concept tree has one or more nodes representing one or more concepts corresponding to table values of enterprise domain data.

BACKGROUND

Existing research on knowledge discovery mostly relies on using natural language techniques and textual documents. However, efforts have been mostly focused to the public web domain. There are entire private networks were knowledge discovery has yet to be performed. Each of these enterprise domains have their own entities and concepts that share little overlap between enterprises (e.g., each enterprise will have its own product categorizations, cost-center classifications, sand organizational hierarchies, etc.).

Despite the success of natural language-based techniques in the public web domain, such techniques are often not reliable when applied to an enterprise domain. As one example, text documents are scarcer in enterprises than in the general web. While textual documents obtained from the public web typically have thousands of mentions of common sense knowledge embodied in text forms, the enterprise domain is typically lacking in such common sense knowledge. Furthermore, knowledge obtained from an enterprise domain may not be represented in plain English texts.

Furthermore, natural language-based techniques tend to generate instances that are not exactly compatible with each other. In particular, entity instances appearing in the public web domain may be at different conceptual levels and not consistent with each other, due to the idiosyncrasy in how people mention these entities. Entity-concept relationships so discovered may involve substantial post-processing and cleaning before they can be used. Given that each enterprise has its own proprietary data, this is thus difficult to apply and expensive to scale. Accordingly, conceptualizing data at the enterprise level and within private domains is challenging and under-utilized.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
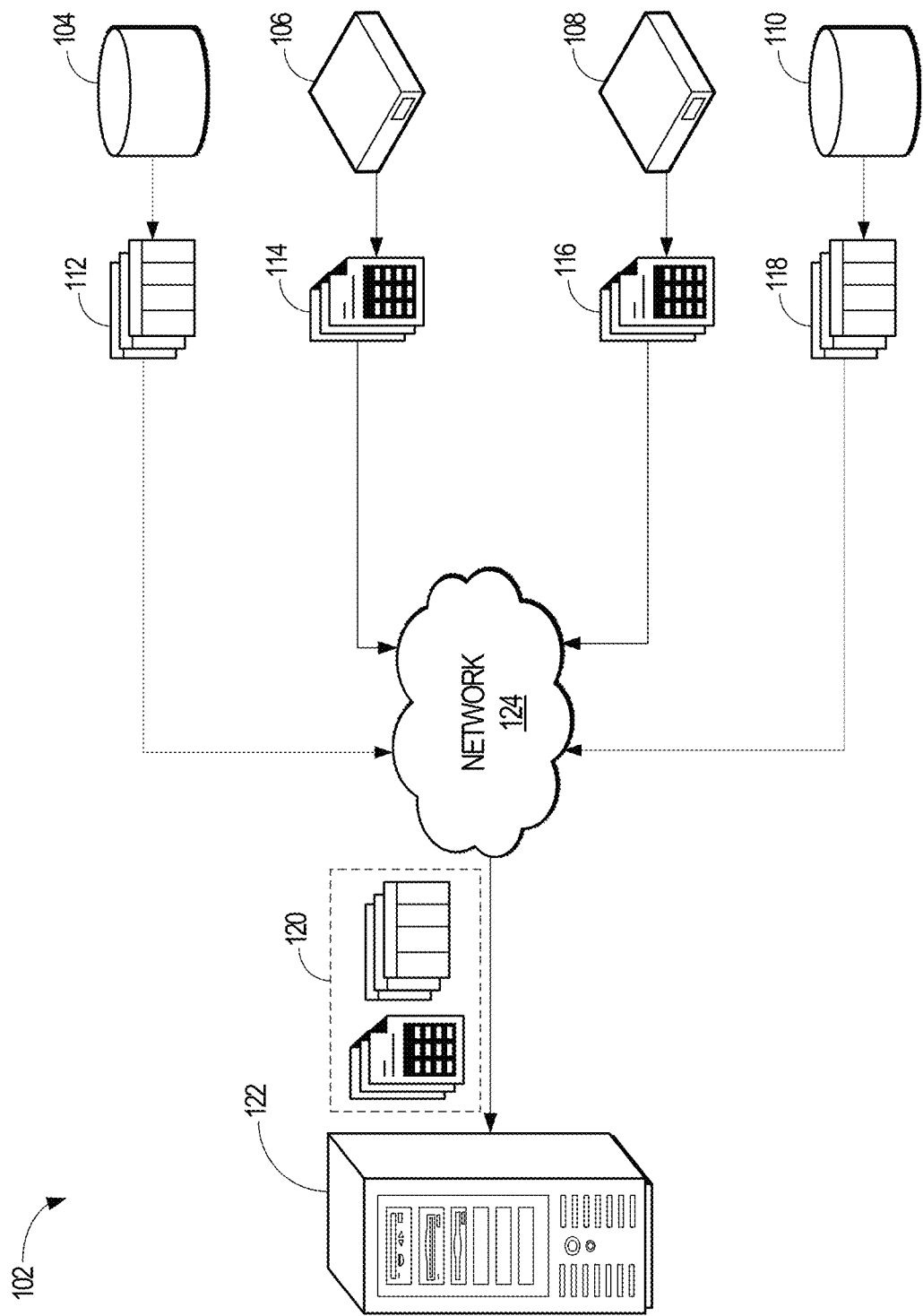
FIG. 1 is an architecture diagram illustrating a table corpus processing server in communication with various datastores and computer-readable storage devices via a network, according to an example embodiment.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure involve systems and methods for knowledge discovery using a large table corpus within an enterprise domain. In performing the knowledge discovery, the systems and methods disclosed herein cluster one or more values according to concepts, and attempt to represent the organization of such values according to the clustering. Given the input of a universe of all the values that appear in the table body V and a set of columns C, each is a collection of values, $c \subseteq V$, $c \in C$, the output concepts are a set $O=\{o|o \subseteq V\}$, where each is again a collection of the values.

In determining the output concepts, the approach generally has two major steps, with one or more operations for each major step. In the first step, the disclosed systems and methods compute one or more statistical co-occurrence values between all values in the table corpus. These co-occurrence values are then then iteratively merge into clusters in a bottom-up, hierarchical manner. This is because natural concepts follow a tree hierarchy, starting from the narrow concept in the leaf nodes, up to root levels with super-categories and broad concepts. The disclosed systems and methods iteratively merge values closely related to each other first, which, in later iterations, are expanded include less coherent values. This results in a clustering dendrogram, with a large number of coherent clusters in a deep hierarchical tree. These values may be denoted by a defined node set, where each node o is characterized by the set of values $o \subseteq V$, and edge set $E_c \subset \{(o_1, o_2|o_1 \subset o_2, o_1 \in O_c, o_2 \subset O_c\}$ that represents containment relationships. The resulting hierarchical tree structure ($O_c$, $E_c$) represents a candidate concept tree that is used as an input for the second major step.

One of the technical challenges in implementing the disclosed candidate concept tree is scaling bottom-up clustering to a large graph, with over ten million entity nodes, where each entity nodes represents a distinct value identified in a given table cell. To address this technical challenge, the disclosed systems and methods implement an adapted random-mate algorithm for computing connected components, one implementation of which is disclosed in the non-patent literature, Rastogi et al, "Finding Connecting Components in Map-Reduce in Logarithmic Rounds," *Data Engineering (ICDE)*, 2013 *IEEE 29th International Conference on*, pages 50-61 ("Rastogi"), the disclosure of which is hereby incorporated by reference in its entirety. The result of this operation is one or more clusters that are used as input for the second major step.

In the second major step, and in one embodiment, a subset of nodes $O \subseteq O_c$ are selected from the candidate concept tree ($O_c$, $E_c$) that are likely to correspond to concepts represented in the corpus of values. This second major step represents a process of reducing the candidate concept tree into a much shallower tree. The shallower tree is easier for a person to both inspect and curate. To produce the shallower tree, the tree-reduction problem is formulated as an optimization problem, which finds a sub-tree of fixed depth that best describes the original table corpus. The rationale supporting this process is that such a sub-tree likely retains nodes corresponding to important concepts, and is consistent with the general principle of minimum-description-length. As a large table corpus can result in significant processing times, this disclosure further provides for a parallel dynamic programming algorithm that solves the problem optimally and scales accordingly.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 is an architecture diagram 102 illustrating a table corpus processing server 122 in communication with various datastores and computer-readable storage devices 104-110 via a network 124, according to an example embodiment. To avoid obscuring the inventive subject matter with unnecessary detail, various functional components (e.g., modules and engines) that are not germane to conveying an understanding of the inventive subject matter have been omitted from FIG. 1. However, a skilled artisan will readily recognize that various additional functional components may be supported by the table corpus processing platform 102 to facilitate additional functionality that is not specifically described herein.

While the table corpus processing platform 102 shown in FIG. 1 employs a client-server architecture, the disclosed subject matter is, of course, not limited to such an architecture, and could equally well find application in other architectures, such as an event-driven, distributed, or peer-to-peer architecture system. Further, the various functional components of the table corpus processing platform 102 may be implemented as standalone systems or software programs, which do not necessarily have networking capabilities. Moreover, it shall be appreciated that although the various functional components of the table corpus processing platform 102 re discussed in the singular sense, multiple instances of one or more of the various functional components may be employed.

As shown, the table corpus processing platform 102 includes a table corpus processing server 122 in communication with a various datastores 104,110 and computer-readable storage devices 106-108. In addition, the table corpus processing server 122 may be in communication with one or more networks of distributed computing devices to handle dynamic processing of the disclosed candidate clusters. Although not shown in FIG. 1, the distributed computing devices may be assigned one or more candidate clusters according to the dynamic programming algorithm disclosed herein.

The table corpus processing server 122, the datastores 104, 110 and/or the computer-readable storage devices 106-108 may be connected to the network 124 through a variety of different mechanisms. For example, in some instances, the table corpus processing server 122, datastores 104,110 and/or the computer-readable storage devices 106-108 may be connected to the network 124 via a Wi-Fi connection (e.g., 802.11a/b/g/n), a Worldwide Interoperability for Microwave Access (WiMAX) connection, Bluetooth®, another type of wireless data connection, or combinations thereof. In such an embodiment, the network 124 may include one or more wireless access points coupled to a local area network (LAN), a wide area network (WAN), such as the Internet, or other packet-switched or circuit-switched data network. In other instances, the connections to the network 124 may be a wired connection, for example an Ethernet link, and the network 124 may be a LAN, a WAN, the Internet, or other packet-switched or circuit-switched data network.

The table corpus processing server 122 may be any computing device, or combination of computing devices, configured to access and retrieve information from one or more of the datastores 104,110 and/or the computer-readable storage devices 106-108. Examples of the table corpus processing server 122 include, but are not limited to Apache Spark™, Microsoft® Azure® Data Lake (ADL); a content management service such as Microsoft® SharePoint®; Microsoft® Azure® Data Catalog; Microsoft® Office 365®; Microsoft® Bing®; unstructured data stores/processing systems (e.g., Microsoft® Azure® Data Lake, Apache Hadoop®, Splunk®, etc.); structured data sources (e.g., Microsoft® SQL Server®, Microsoft® Azure® SQL, and other relational databases (RDBMS)); and, database appliances. The table corpus processing service 122 may be further configured to run in a distributed environment, such as a public "cloud," private "cloud," or on a client device. One or more applications used to access the table corpus processing server 122 may be executed by various types of devices, including mobile devices. The table corpus processing server 122 may use one or more different types of storage technology and/or networking/compute fabric such as a solid-state drive (SSD), shared memory using remote direct memory access (RDMA), non-volatile random access memory (NVRAM), and other such storage and/or memory technologies. Although illustrated as a single server, the table corpus processing server 122 may be implemented as a distributed computing platform that includes multiple servers in communication with each other and/or in communication with a central server that assigns one or more tasks to each of the servers.

For example, the table corpus processing server 122 may instantiate a framework for analyzing and processing the values stored in each of the database tables 112,118 and the values stored in the spreadsheet files 114,116. One example of such a framework is Apache Hadoop, which is an open-source software framework for the distributed storage and processing of large amounts of data on one or more data clusters. In addition, the table corpus processing server 122 may implement a filesystem to process the information extracted from each of the datastores 104,110 and/or each of the computer-readable storage devices 106-108, such as the Hadoop Distributed File System (HDFS). As known to one of ordinary skill in the art, HDFS splits files into large blocks (default 64 MB or 128 MB) and distributes the blocks among the nodes in the cluster. Additionally or alternatively, the table corpus processing server 122 may implement other filesystems such as the Amazon S3 filesystem, the Windows Azure Storage Blobs (WASB), or any other such filesystem designed to support large amounts (e.g., petabytes, exabytes, zettabytes, etc.) of information.

Each of the datastores 104, 110 and/or the computer-readable storage devices 106-108 include data that is structured as a table or is table-like. In this regard, the data accessible via the datastores 104, 110 and/or computer-readable storage devices 106-108 may be considered the table corpus. For example, the datastores 104,110 may include one or more database tables 112,118, where each database table is implemented as a two-dimensional table having one or more columns and/or one or more rows. The datastores 104,110 may be implemented as a relational database, a hierarchical database, one or more flat files, or other logical construct for structuring data. The computer-readable storage devices 106-108 may store one or more files 114-116 that represent data in a spreadsheet form (e.g., table-like), where the spreadsheet includes one or more columns and/or one or more rows. The table processing server 122 is configured to retrieve one or more values represented by the intersection of the one or more columns and/or one or more rows for each of the database tables 112,118 and for each of the files 114-116. The values extracted from the various database tables 112,118 and spreadsheet files 114-116 are stored as extracted values 120. In one embodiment, the values extracted from the database 112,118 and the spreadsheet files 114-116 may be stored in a logical arrangement (e.g., an array or other logical construct) so as to preserve the column structure of the database table and/or spreadsheet file from which the extracted values 120 were obtained. In this manner, when one or more values are extracted from a given column of a database table and/or spreadsheet file, the values of the given column maintain their associations. Additionally, and/or alternatively, the ordering in which the values appear in the given column may also be preserved.

Figure 2:
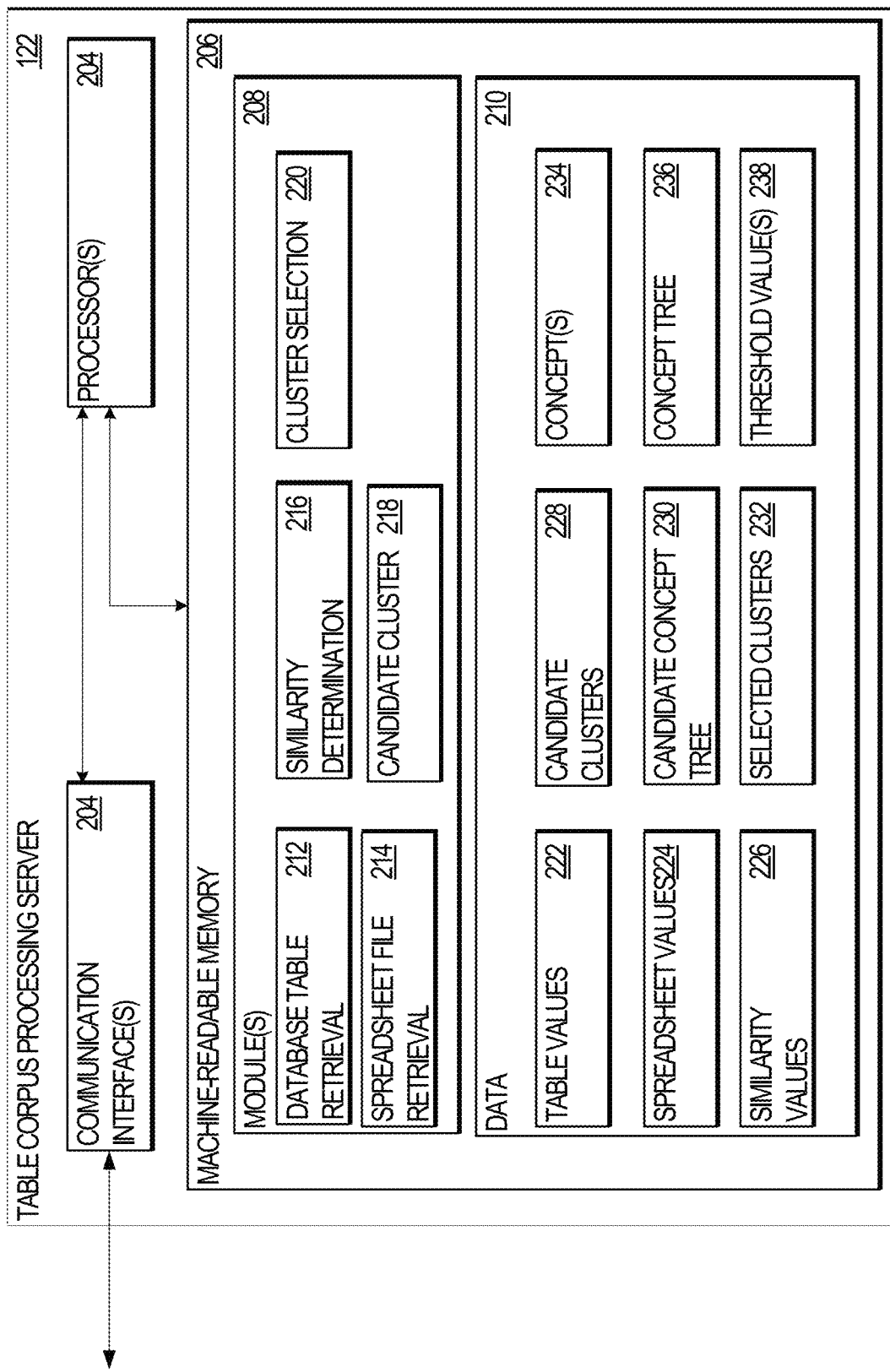
FIG. 2 is a block diagram of the table corpus processing server illustrated in FIG. 1, according to an example embodiment.

The table corpus processing server 122 may be configured with one or more components and/or modules to facilitate the extraction of the various values from the datastores 104,110 and/or the computer-readable storage devices 106-108. FIG. 2 is a block diagram of the table corpus processing server 122, according to an example embodiment. In one embodiment, the table corpus processing server 122 includes one or more processors 202, one or more communication interface(s) 204, and a machine-readable memory 206.

The various functional components of the table corpus processing server 122 may reside on a single computer (e.g., a server), or they may be distributed across several computers in various arrangements. The various components of the table corpus processing server 122 may, furthermore, access one or more databases, and each of the various components of the table corpus processing server 122 may be in communication with one another. Further, while the components of FIG. 2 are discussed in the singular sense, it will be appreciated that in other embodiments multiple instances of the components may be employed.

The one or more processors 202 may be any type of commercially available processor, such as processors available from the Intel Corporation, Advanced Micro Devices, Texas Instruments, or other such processors. Furthermore, the one or more processors 202 may be of any combination of processors, such as processors arranged to perform distributed computing. In one embodiment, the one or more processors 202 are implemented as hardware processors. In another embodiment, the one or more processors 202 are implemented as software processors.

The one or more communication interface(s) 204 may be configured to retrieve various values from the datastores 104,110 and/or the computer-readable storage devices 106, 108. The one or more communication interface(s) 204 may also facilitate communications between the table corpus processing server 122 and other computers communicatively coupled as a communications network. In that regard, the one or more communication interface(s) 204 may be a wired interface, such as an Ethernet interface, a wireless interface, such as an 802.11g/n interface, or a combination of wired and wireless interfaces.

The machine-readable memory 206 includes various modules 212 and data 214 for implementing the features of the computing device 104. The machine-readable memory 206 includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable memory" should be taken to include a single medium or multiple media (e.g., a centralized or distributed database, or associated caches and servers) able to store the modules 212 and the data 214. Accordingly, the machine-readable memory 206 may be implemented as a single storage apparatus or device, or, alternatively and/or additionally, as "cloud-based" storage systems or storage networks that include multiple storage apparatus or devices. As shown in FIG. 2, the machine-readable memory 206 excludes signals per se.

The module(s) 208 may include one or more applications and/or modules 212-220. As is understood by skilled artisans in the relevant computer and Internet-related arts, each of the components 212-220 (e.g., a module or engine) may represent a set of executable software instructions and the corresponding hardware (e.g., memory and processor) for executing the instructions. In one embodiment, the module(s) 208 include a database retrieval module 212, a spreadsheet file retrieval module 214, and a similarity determination module 216. The module(s) 208 may further include a candidate cluster module 218 and a cluster selection module 220. In one embodiment, the modules 208 are written in a computer-programming and/or scripting language. Examples of such languages include, but are not limited to, C, C++, C #, Java, JavaScript, Perl, Python, Ruby, or any other computer programming and/or scripting language now known or later developed.

The module(s) 208 may interact with data 210 stored in the machine-readable memory 206, such as the retrieved table values 222 and spreadsheet values 224 (corresponding to the extracted values 120 of FIG. 1), one or more co-occurrence values 226, and various candidate clusters 228. The data 210 may further include data representing a candidate concept tree 230, one or more selected clusters 232, one or more identified concept(s) 234, and various threshold value(s) 238. The various application(s) 208 and data 210 are discussed below.

As discussed with reference to FIG. 1, the database retrieval module 212 and the spreadsheet file retrieval module 214 are configured to extract one or more values from the database tables 112,118 and the spreadsheet files 114,116. The extracted values 120 are then stored as the retrieved table values 222 and the retrieved spreadsheet values 224.

Using the retrieved table values 222 and the retrieved spreadsheet values 224, the similarity determination module 216 is configured to determine one or more similarity values 226. In one embodiment, the similarity determination module 216 employs statistical value co-occurrence to compute a similarity between any two values of the table values 222 and/or spreadsheet values 224 to capture the semantic relatedness of these two values. For example, if a first value (e.g., "France.02.SVCSRLCT") co-occurs frequently with a second value (e.g., "Germany.06.MNFEU") in the same columns of the one or more database tables 112,118 and/or spreadsheet files 114-116, this pair of values is likely to have a high similarity score.

Accordingly, a corpus-driven approach is used to define similarity s: V×V→(0,1) for each pair of values. The similarity determination module 216 may use one or more set-based and/or vector-based equations to determine the similarity values 226, such as Pointwise Mutual Information (PMI), the Sorensen-Dice coefficient, the Jaccard index, or any other statistic used for comparing one or more sample sets and/or values. Where a first table is assigned as $v_1$ and a second table is assigned as $v_2$, the similarity value between $v_1$ and $v_2$ using the Jaccard index is stated as:

$$s(v_1, v_2) = \frac{|\{c \mid v_1 \in c\} \cap \{c \mid v_2 \in c\}|}{|\{c \mid v_1 \in c\} \cup \{c \mid v_2 \in c\}|} \quad \text{(eq 1)}$$

As discussed above, the similarity determination module 216 determines one or more similarity values 226 using $s(v_1, v_2)$, where $v_1$ and $v_2$ are each selected from the retrieved table values 222 and the retrieved spreadsheet values 224. Where there are N retrieved table values 222, and M retrieved spreadsheet values 224, then the number of possible similarity values 226 can be determined as $(N^2)+(N \times M)+(M^2)$. In embodiments where there is no distinguishing between the retrieved table values 222 and the retrieved spreadsheet values 224, and the total number of retrieved values is P, then the number of similarity values 226 may be determined as $P^2$.

After the table corpus processing server 122 has determined the one or more similarity values 226, the table corpus processing server 122 then determines one or more clusters of similar values. Accordingly, in one embodiment, the table corpus processing server 122 includes a candidate cluster module 218 to determine the one or more clusters of similar table values 222 and similar spreadsheet values 224. The candidate cluster module 218 may implement one or more clustering algorithms including, but not limited to, single-link, average-link, complete-link, correlation clustering, and density-based clustering. Further still, the candidate cluster module 218 may be implemented as, or as part of, MapReduce, which is one component of Apache Hadoop. As known to one of ordinary skill in the art, MapReduce is a component that parcels out work to various nodes within a cluster (or map), and it organizes and reduces the results from each node within the cluster into a cohesive answer to a given query. The cluster nodes determined by the candidate cluster module 218 may be stored as the candidate clusters 228. The resulting hierarchical tree structure constructed by the candidate cluster module 218 may be stored as the candidate concept tree 230.

One of the technical challenges encountered with one or more of the clustering algorithms, such as average-link clustering, is that the complexity of executing average-link clustering can be on the order of $O(n^3)$, which can be difficult to scale to large data sets where n is greater than ten million. To address this technical challenge, the disclosed table corpus processing server 122 efficiently partitions the data and reduces the number of clustering rounds to achieve both space and time efficiency.

As disclosed herein, the implementation of the candidate cluster module 218 may be viewed as a batch version of agglomerative clustering. Rather than selecting one pair of nodes to merge in one iteration as in traditional agglomerative clustering, the candidate cluster module 218 merges multiple values in each round. In particular, the candidate cluster module 218 collapses all node pairs whose edge scores are higher than a selected similarity threshold. For that iteration, this effectively reduces to computing connected component in a distributed setting, since it can disconnect one or more (e.g., all) nodes whose scores are lower than the threshold, and treat all remaining edges as unweighted. In subsequent iterations, the candidate cluster module 218 then gradually lowers the threshold. In one embodiment, the methodology and operations implemented by the candidate cluster module 218 may reflect standard agglomerative clustering if, in every iteration, the candidate cluster module 218 lowers the similarity threshold just enough to only merge one pair of nodes.

One embodiment of the algorithm implemented by the candidate cluster module 218 is listed below:

Algorithm 1
Exhaustive hierarchical concept enumeration (s: V × V → R,V, k)

```
1:    O⁰ ← V
2:    E⁰ ← {(v₁, v₂, s(v₁, v₂))|(v₁, v₂) ∈ O⁰ × O⁰}
3:    θ⁰ ← SetThreshold(E⁰, 1), i ← 0
4:    while θ⁰ > 0 do
5:        E_Merge ← {v₁, v₂|v₁, v₂s(v₁, v₂) ∈ Eⁱ, s(v₁, v₂) > θⁱ}
6:        Oⁱ⁺¹, Eⁱ⁺¹, Fⁱ ← ConnectedComponents(Oⁱ, E_Merge)
7:        θⁱ⁺¹ ← TopK(Eⁱ⁺¹, k)
8:        i ← i + 1
9:    return (∪ Oⁱ,∪ Fⁱ)
```

In Algorithm 1 (above), at each clustering iteration $\underline{i}$, the candidate cluster module 218 maintains a graph of supernodes $V_i$ and edges $E_i$, where each supernode is a cluster that includes one or more nodes in the original input V. The candidate cluster module 218 references a batch size threshold $\theta_i$ (stored in the threshold value(s) 238) to determine the batch size, where the edge between any pair of nodes with similarity above $\theta_i$ will be merged in the next round (line 5). In one embodiment, the candidate cluster module 218 is configured to determine the batch size threshold as as the top k score among all edge similarities (line 7). After identifying the pairs of nodes to merge ($E_{Merge}$), the candidate cluster module 218 performs a distributed connected component finding algorithm to merge the current super-nodes $O^i$ into $O^{i+1}$. One example of a distributed connected component finding algorithm is disclosed in Rastogi. The candidate cluster module 218 then redetermines the pair-wise average distance between clusters, which may be determined as a weighted average for the super-nodes contained by the cluster (line 6).

In one embodiment, the table corpus processing server 122 using a dynamic programming approach. More particularly, the table corpus processing server 122 may be configured to assign each node in the input V to a given computing device, where the group of computing devices process the one or more nodes of the input V in parallel.

Using a dynamic programming approach, and for a chosen batch size of k, the number of distributed rounds of processing will be $$O\left(\frac{|V|\log(k)}{k}\right).$$

This processing time is achieved because the merging step is performed with parallel connected component finding, which uses a "Hash to All" technique as described in Rastogi. This technique uses O(log d) rounds, where d is the largest diameter which is bounded by the number of edges to merge k. For the step of determining the threshold, and more specifically, the kth highest similarity to prepare for the merging step, the candidate cluster module 218 may use a quick select algorithm as disclosed in the non-patent literature reference, C. A. Hoare, Algorithm 65: find. *Communications of the ACM*, 4(7):321-322, 1961 ("Hoare"), which is incorporated by reference herein in its entirety. The quick select algorithm may also use approximately O(log k) distributed rounds. In this manner, the number of distributed rounds is $$O\left(\frac{n \log k}{k}\right).$$

Figure 3:
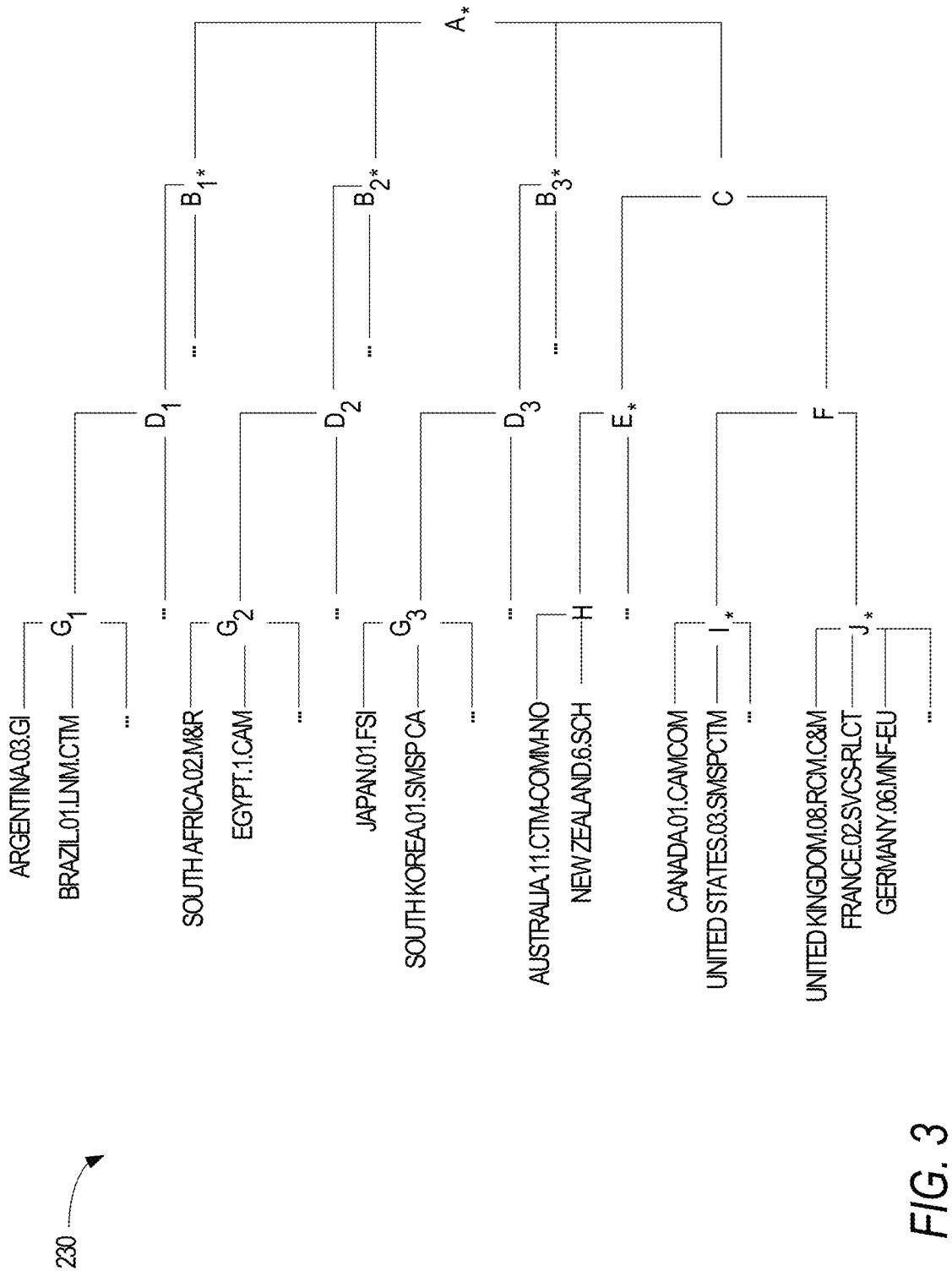
FIG. 3 illustrates a candidate concept tree in accordance with an example embodiment.
Figure 4:
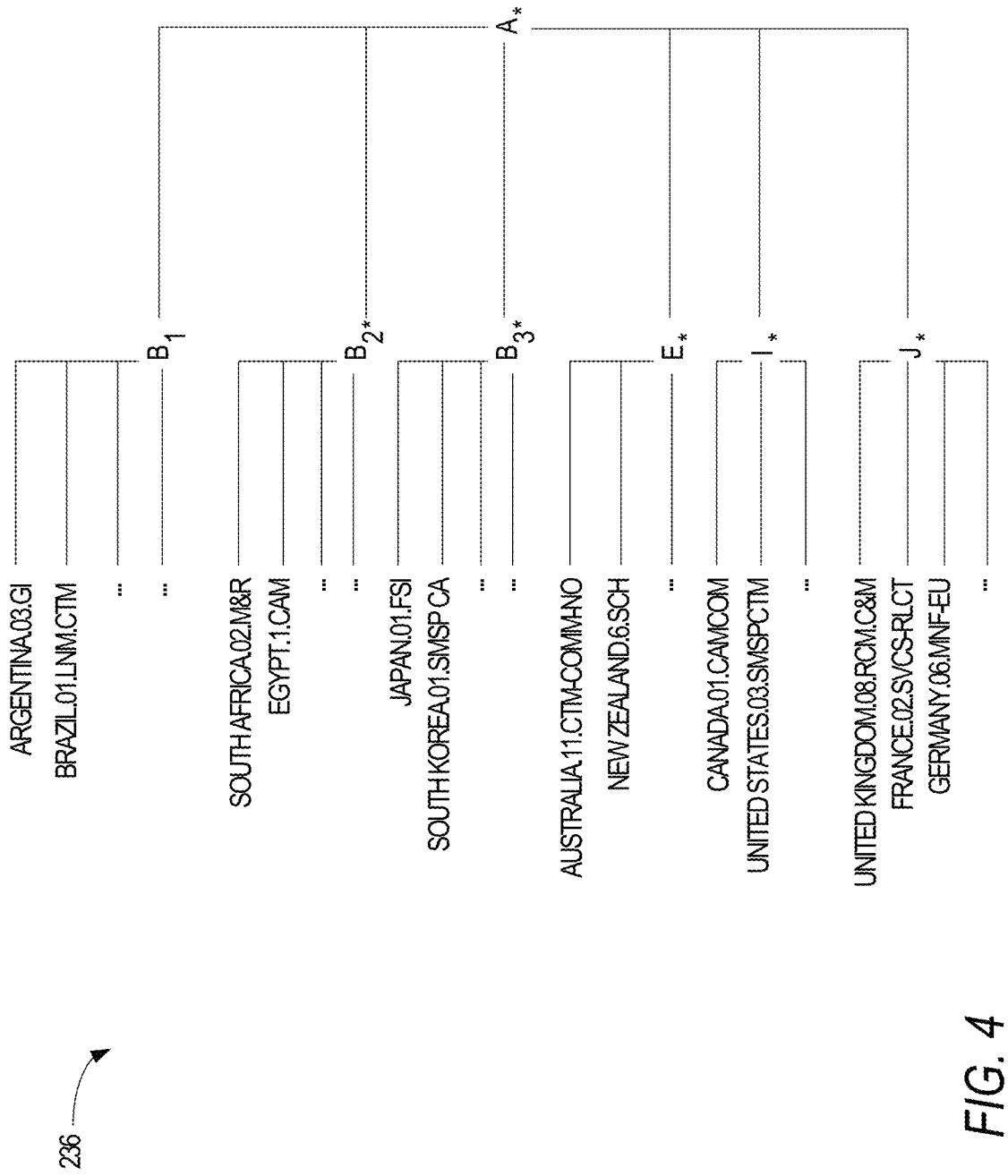
FIG. 4 illustrates a concatenated concept tree having concepts from the candidate concept tree of FIG. 3, in accordance with an example embodiment.

FIG. 3 illustrates an example of a candidate concept tree 230 in accordance with an example embodiment. In one embodiment, the candidate concept tree 230 includes one or more hierarchical codes stored as the table values 222 and/or spreadsheet values 224. In this regard, the hierarchical codes denote ATU (area-team-unit), which is a concept used in customer-relations. Each value in this concept has a distinct geographical component, followed by a number denoting subdivisions, and finally an abbreviated name. In constructing the candidate concept tree 230, the candidate cluster module 218 merges entities with a high similarity to form first-level nodes (e.g., initial candidate clusters 228) corresponding to narrow concepts. The candidate cluster module 218 then iteratively merges the initial set of candidate clusters 228 to form candidate clusters corresponding to "super-concepts" (e.g., clusters that represent one or more concepts) and so forth, resulting in the candidate concept tree 230. By observing the candidate concept tree 230, it is evident that the candidate cluster module 218 (e.g., through Algorithm 1) gradually merges the individual ATUs according to geological locations, into ATUs belonging to the same continent (e.g., because these ATUs occur much more often together in same table columns), and finally into ATUs in the world. This process may produce one or more intermediate clusters not corresponding to useful concepts. Using the candidate concept tree 230 and the candidate clusters 228, the cluster selection module 220 then identifies and/or selects those candidate clusters 228 corresponding to commonly used concepts, which are then used to create a concept tree 236.

In addition, the candidate cluster 218 may associate one or more concept(s) 234 with each of the candidate clusters 228. This association helps to readily identify the concept that a given candidate cluster represents. In one embodiment, the concept(s) 234 are determined from the corpus of database tables and/or spreadsheet files, such as by referencing a label associated with a given column of a database table and/or spreadsheet file. Additionally, and/or alternatively, the concept(s) 234 may be manually populated by a user or administrator of the table corpus processing server 122. In this manner, each of the candidate clusters 228 may be associated with one or more corresponding concept(s) 234.

The idea of selecting clusters from the candidate clusters 228 is based on the following observation: clusters having table values 222 and/or spreadsheet values 224 that are similar to the values appearing in a given table column and/or spreadsheet column are likely to be "high quality" concepts. In this context, "high quality" concepts are considered those concepts where the values within the table column and/or spreadsheet column share have some characteristic in common (e.g., the values represent geographic locations, the values correspond to particular regions or identities, the values correspond to names of personnel and/or buildings, etc.). Conversely, candidate clusters 228 not corresponding to real concepts are less likely to have table values 222 and/or spreadsheet values 224 that are similar to the values appearing in a given table column and/or spreadsheet column. Using this observation, the cluster selection module 220 applies the minimum description length principle in the process of concept selection. Namely, given certain size constraints, the cluster selection module 220 searches for set of nodes that can best "describe" the original corpus (e.g., the arrangement of the particular values), and these selected and resulting clusters will likely correspond to good concepts. As used herein, this disclosure provides for a "describe" function d: $O_c \rightarrow C$ to represent for each candidate cluster node $o \in O_c$ those columns in the original corpus that are similar to o. This disclosure contemplates that the function d(o) represents the "corpus coverage" of candidate o.

An example illustrating the corpus coverage concept may be helpful. In this example, suppose from the candidate concept tree 230 there is a concept o which contains the different countries in the world, and in the corpus (e.g., the collection of database tables and/or spreadsheet files) there is a column labeled as "country" in a relational table labeled "populations of country in the world," which, in this example, is denoted as c. Based on the instances contained in c and o, if c and o mostly contains the same elements, concept o can be considered to "describe" the column c, and this relationship may be written as $c \in d(o)$.

Since a candidate concept o and a column in a table c are characterized by a set, one or more distance similarity values may be used to represent the relationship of $c \in d(o)$. For example, PMI, the Sørensen-Dice coefficient, the Jaccard index, or any other statistic used for comparing one or more sample sets and/or values coefficient, may be used. The determined similarity value(s) may be stored as the similarity values 226 and the similarity threshold value that the cluster selection module 220 uses to determine whether the concept o and a column in the table c are, in fact, similar, may be stored as the threshold value(s) 238.

The cluster selection module 220 may also reference one or more constraints in building the concept tree 236. In doing so, the cluster selection module 220 may also the minimum description length principle. In one embodiment, the cluster selection module 220 uses a size constraint on the selected concepts, such as the number of concepts, the sum of the size of each concept, etc. However, this embodiment may or may not capture the redundancy of the resulted concepts: selecting the concept of "cities" as a selected candidate cluster should not affect selecting the concept of "countries" as these concepts are generally are not redundant. However, selecting the cluster selection module 220 may be configured to avoid selecting two similar concept nodes that both correspond to the concept of "cities," as this concepts redundant. Accordingly, the cluster selection module 220 may employ a redundancy measure that takes advantage of the topological structure of a tree. In this regard, one will observe that the results of the tree node selection (e.g., the selected candidate clusters 232) is not simply a flat set of nodes, but a concatenated tree, from which the cluster selection module 220 can derive a finer-grained size measure.

As used herein, this disclosure contemplates the definition of a "concatenated subtree." Given a forest with nodes V, edges E, a subset of nodes V'⊆V, a concatenated subtree, induced by V'⊆V, denoted $(V_s, E_s)$, can be obtained. First, the cluster selection module 220 includes all of V' into $V_s$, and obtains the "hierarchy" by including all such edges connecting nodes v∈V' to its closest ancestor that is also in V' into $E_s$. Finally, to create a "proper" tree, the cluster selection module 220 adds a dummy node $v_0$ as a root and connects all nodes that do not have a parent to the dummy node.

Since the subset selection of tree nodes and concatenated subtree has a one-to-one correspondence, these two sets of nodes can be viewed two interchangeably. However, the concatenated subtree representation provides an insight about potential redundancy in one or more of the represented concepts: for a concept tree of height k, it will have, for each value, k concepts nodes that contains it. Although for a real-world concept, the taxonomy can be of many layers and a single instance, such as "United Kingdom.08.RCM.C&M" can be contained by multiple concepts such as "ATUs in West Europe," "ATUs in Europe," "ATUs in the world," and other such concepts or combination of concepts. As one value could potentially occur in multiple concept nodes, this could lead to having a concept tree of unlimited height (e.g., to have too many concept nodes covering the same instance). Allowing a concept tree of unlimited height would eventually lead to a concept tree having redundant tree nodes.

This observation leads to defining a constraint problem: the height of the concatenated subtree. This problem can be stated in an abstract manner: given a tree, a target set, and a source-target mapping between the two, output a concatenated subtree subject to a height constraint that maximizes the mapped target set. More concretely, the problem may be stated thusly: Given an input tree with nodes (V, E), a set of targets C, a target coverage function d: $V \rightarrow 2^C$, a height constraint h, select a set of tree nodes, $V_S \subseteq V$, so that the concatenated subtree $V_S$, $E_S$ induced by $V_S$, has a height that is at most h, and the corpus coverage $U_{v \in V_S} d(v)$ is maximized. A concatenated subtree is used as an output instead of the selected, as these structures are relatively interchangeable, and the tree structure has the added benefit of providing provide auxiliary information on the output concepts.

Figure 5:
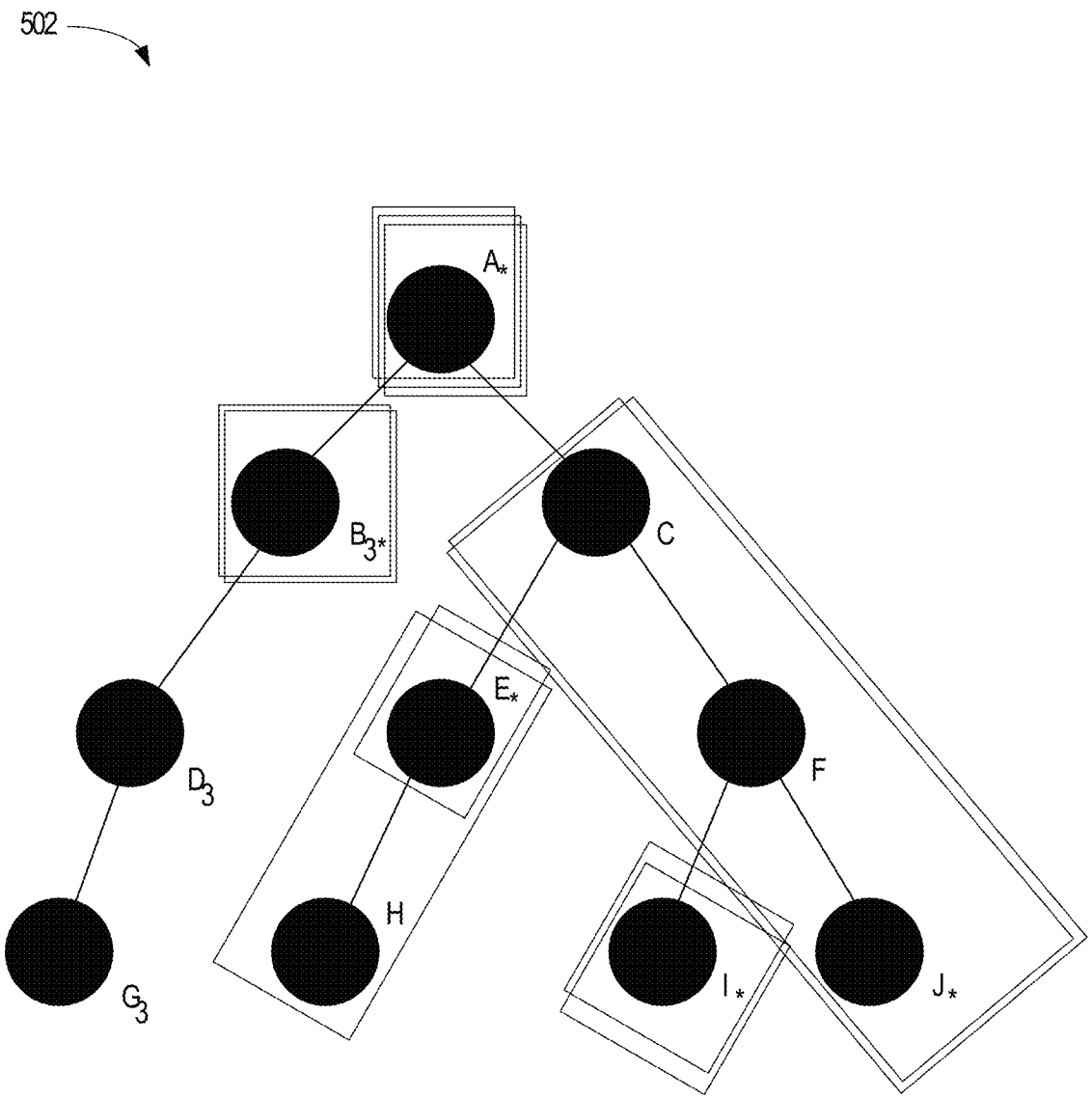
FIG. 5 illustrates a dynamic programming approach to building a concatenated concept tree using the candidate concept tree of FIG. 3, in accordance with an example embodiment.

FIG. 5 illustrates a dynamic programming approach to building a concatenated concept tree 502 using the candidate concept tree of FIG. 3, in accordance with an example embodiment. In FIG. 5, various annotations have been illustrated to denote different types of relationships: a circle denotes a candidate concept node, a line denotes an edge, each rectangle denotes a specific column in the corpus, and a circle enclosed by a rectangle is a candidate concept node that can describe that specific column. FIG. 5 illustrates one result of applying the foregoing coverage function to one or more of the nodes of the candidate concept tree 230. Referring to FIG. 3 and FIG. 5, branches $B_{1*}$, $B_{2*}$, and $B_{3*}$ of the candidate concept tree 230 have nearly identical situations, so only branch $B_{3*}$ is illustrated in the concatenated concept tree 502 to represent these three branches. FIG. 5 also illustrates that some of the concept nodes, such as nodes C, F, and J, cover the same target rectangles. These concept nodes are therefore redundant in terms of maximizing the number of targets to be covered.

Referring back to FIG. 3 and the candidate concept tree 230, a potential concept hierarchy emerges from the structure of the candidate concept tree 230, namely, a first concept node representing all ATUs in the world (represented by node A*), and a concept node of ATUs for each of the six continents (represented by nodes $B_1^*$, $B_{2*}$, $B_{3*}$, $E_*$, $I_*$, and $J_*$. Approaching this structure under the guise reducing redundancy, one observes that the joint set of nodes A*, $B_{1*}$, $B_{2*}$, $B_{3*}$, $E_*$, $I_*$, and $J_*$ has a corpus coverage of 15, e.g., covers at least 15 rectangles (which are illustrated in FIG. 5). The 15 rectangles are obtained by solving a concatenated subtree selection with a height constraint (CSSHC) problem with a height constraint of two (2).

The CSSHC problem may be considered APX-hard through a gap-augmenting reduction from the Set Cover problem. One known to one of ordinary skill in the artm the Set Cover problem is generally phrased as: Given a set of elements {1, 2, . . . , n} (called the universe) and a collection S of m sets whose union equals the universe, the set cover problem is to identify the smallest sub-collection of S whose union equals the universe. One observes that the CSSHC problem is APX-hard through the following proof:

For a given set cover instance A, target set C is constructed such that each c∈C corresponds to one element in A, and all c∈C are disjoint. A forest of nodes is constructed as a one single leaf to root path, where each node corresponds to one set in set cover instance A. Starting from a given leaf, each time one level is traversed upward in the path, and a node i is reached, which may be a bigger cluster than its child, the size of the cluster is increased from its child to the current node i by a ratio p large enough. Depending on whether the increased cluster should cover one or more columns, according to the mapping relation in A, an ∝+∈(p) portion of the newly added elements is assigned to the cluster of i such that the intersection is no lower than the portion of the cluster of i. As the size of the cluster of i can be made bigger than any columns, a node can be constructed at each level that describes an arbitrary column set. Moreover, at each new level, the assignment of newly added instances are independent of lower levels; thus, the tree can be traversed from root to leaf and the desired reduced instance can be constructed from any given set cover instance.

As the foregoing problem of selecting a concatenated tree is APX-hard, one of the technical challenges in selecting the concatenated tree is doing so in a timely and efficient manner. Moreover, as enterprises typically retain vast amounts of internal knowledge (e.g., thousands of database tables and/or spreadsheet files), such solution should scale to large datasets. Accordingly, this disclosure introduces a bottom-up induction scheme: define sub-problems for each tree node o, with respect to the (not concatenated) subtree rooted at o: the node itself and its entire descendants. Through induction, the solution to subproblems (STS) is applied to the subtree and its children nodes to get the STS to the subtree of its own.

In one embodiment, a first approach records, in the solution to subproblems (STS), the set of all possible concatenated subtree selection with a given height constraint for the subtree rooted at that node. This approach satisfies the "principle of optimality": a concatenated subtree of a parent node comes from concatenated subtrees from its children node; thus, the set of all possible nodes, so the STS at a current node can be obtained by combining STSs at its children nodes. Eventually the STS at the root node is obtained, and the best concatenated subtree is then selected.

This disclosure contemplates another embodiment that builds upon this naive approach, but stores the STSs in a more compact way. This approach presents a technical solution to the technical problem of storing large STS in retaining the performance of the naive enumeration approach while reducing the computation time and size of solution into reasonable amount. This additional embodiment is a dynamic programming approach that is parallel by design and may be implemented using a Map-Reduce computing platform. In this additional embodiment, empirical testing yielded results for terabytes-data within a few hours.

Like in the naïve approach, the STS is a set of possible CSSHCs, but one that is trimmed. One of the initial technical problems is representing the CSSHC compactly. To do so, instead of storing the real tree (O, E), the CSSHC may be represented by categorizing the type of targets it covers and storing a count for each category. To address this technical problem, this disclosure introduces the properties of a "target," such as "source coverage," "lineage target," "partial lineage target," and "non lineage target."

The term "source coverage" may be explained as follows: Given a tree (V, E), a target set C, a source target mapping specified as d: $V \rightarrow 2^C$, the source coverage for a target $c \in C$ is defined as $d^{-1}(c) = \{v | v \in V, c \in d(v)\}$. It has been observed observe that the source coverage of targets typically follows a specific pattern, which may be denoted as a "continuous lineage target."

The term "lineage target" may be explained as follows: A target is a "lineage target" if its source coverage is a tree "path"—a sequence of nodes and edges connecting a node with a descendant. The start node $o_{start}$ is the lowest descendent in that path, and ending height $h_{end}$ is the height of highest ancestor in the path. For these types of targets, they can be captured using $o_{start}$, $h_{end}$ in the implementation, in a fully parametric way, since the source that is mapped to this target is exactly the same given these two parameters.

The term "partial lineage target" may be explained as follows: A target is a partial lineage target if its source coverage is a not tree "path", but it is a subset of a tree "path". With a partial lineage target, its start node $o_{start}$ is the lowest descendent in that path that is also within its source coverage, and ending height $h_{end}$ is the height of highest ancestor in the path within its source coverage.

The term "non-lineage target" may be explained as follows: A target is a non-lineage target if it is not a subset of any tree "path." A non-lineage target has a collection of start nodes $O_{start}$ that are nodes which itself is in the source coverage and none of its descendants are. A non-lineage target also has a height $h_{end}$, which is the height of the highest node in the source coverage.

Referring back to FIG. 5, all of the targets (e.g., one or more of the rectangles) are lineage targets, because the candidate concepts in the path of the tree 502 are similar in content and thus describe the same column in a table. If there was an anomaly, such as a target with a source coverage of $A_*, C, J_*$, this target would be a partial lineage target. If there was a target with a source coverage of $I_*, J_*$, the target would be a non-lineage target.

Given the above characterizations and properties, a CSSHC may be represented in the following way. The CSSHC counts for all covered targets n, a $\text{dict}_L$, storing the count for lineage targets that are not mapped by the already selected nodes and are "active." In this regard, the CSSHC has a node where at least one of its descendant node has a similarly defined $\text{dict}_{PL}$ for partial lineage target based on a given key $o_{start}$; $h_{end}$; $d^{-1}(c)$, where $d^{-1}(c)$ is the source coverage, and the solution for a scenario $\text{dict}_{NL}$, it will be based on a target identifier, storing a count of what is non-covered, non-lineage columns. For convenience, the single solution of this CSSHC is referred to as l. A solution l may be treated as an "object," whose corresponding fields can be accessed by l, n, $\text{l.dict}_L$, $\text{l.dict}_{PL}$, and $\text{l.dict}_{NL}$.

The induction results that propagate through the induction are a set of all possible CSSHC, based on a predefined partial ordering $\geq_{CSSHC}$: if a solution is impossible for a solution $CSSHC_2$ to be more optimal than a solution $CSSHC_1$, no matter what the future decision will be, there should be a $CSSHC_1 \geq_{CSSHC} CSSHC_2$. Thus the induction results, e.g., the STS, are the set of CSSHC who is not covered by any other possible CSSHCs.

In one embodiment, the induction for STS, which is a set of CSSHC, has the following induction rule: obtain one CSSHC for each possible combination of CSSHCs from STSs from children nodes, gather the results and discard ones that are covered by others according to the predefined partial ordering $\geq_{CSSHC}$.

In one embodiment, the procedure for obtaining a CSSHC from a specific combination of CSSHCs for each child node can be described in primarily four steps 1) adding up the corresponding fields from children nodes; 2) for all targets with current node as starting nodes, add them into dicts; 3) if the current node is to be included into a CSSHC, convert the counts in the dict into the counts for covered targets; and 4) discard entries in the dictionary that will not be "active" in the future or, in other words, those that have ones with $h_{end}$ no more than the height of current node.

For illustration, the induction can be briefly described with the following formula:

$$S_1 = \{\text{notIncludeCurrent}(l_1, l_2, \ldots, l_{k_v}) | (l_1, l_2, \ldots, l_{k_v}) \in STS(j_1, h) \times STS(j_2, h) \times STS(j_{k_v}, h)\} \quad (1)$$

$$S_2 = \{\text{notIncludeCurrent}(l_1, l_2, \ldots, l_{k_v}) | (l_1, l_2, \ldots, l_{k_v}) \in STS(j_1, h-1) \times STS(j_2, h-1) \times STS(j_{k_v}, h-1)\} \quad (2)$$

$$STS(v, h) = \text{trim}(S_1 \cup S_2) \quad (3)$$

In the foregoing equations, the expression notIncludeCurrent corresponds to the induction scenario of not including the current node in the reduced tree CSSHC (e.g., lines 15-20 in Algorithm 6, below). The expression includeCurrent corresponds to the scenario of not including the current node in the CSSHC (e.g., lines 22-28 of Algorithm 6). The expression trim corresponds to the operation of discarding the CSSHC that is covered by other CSSHCs in the set according to partial ordering $\geq_l$ (e.g., line 29 of Algorithm 6).

A dynamic programming approach can be used to find an optimal solution for the concatenated concept tree 502 of FIG. 5. The optimal solution for the concatenated concept tree 502 with a height constraint of two, represented as {n=15, dict$_L$, ={ }}, is obtainable using a dynamic programming approach because it is generated from a CSSHC with a height constraint of one from each of its children B$_{1*}$, B$_{2*}$, B$_{3*}$, and C, where each of these nodes can be represented as {n=2, dict$_L$, ={ }}, {n=2, dict$_L$, ={ }}, {n=2, dict$_L$, =}}, and {n=6, dict$_L$, ={ }}, respectively. The CSSHC for children nodes, represented as {n=6, dict$_L$, ={ }}, at node C, for example, is in turn generated from a CSSHC with a height constraint of one with its children, nodes E and F, which can be represented as {n=2, dict$_L$, ={ }} and {n=6, dict$_L$, ={ }}. Furthermore, the CSSHC for the grandchild node E is generated from a CSSHC with a height constraint of zero from the child node of node E, namely, node H, which may be represented as {n=0, dict$_L$, ={(h, 2):1}}. [for inventors: can you please clarify the next sentence?] In other words, a CSSHC which covers 0 targets yet, but have a active lineage target set, containing a count 1 for this type of lineage target: ones with start node h and ending height 1.

One example of pseudocode for the disclosed dynamic programming is shown in below Algorithm 6. To simplify notations, four steps have been abstracted into four sub-procedures: 1) sum_from_children; 2) add_new_targets; 3) cover_active_targets; 4) filter_targets. In sum_active_targets, the procedure sums the entries for each of the dictionaries storing different categories of targets. In add_new_targets, the procedure adds the count for newly emerged targets, e.g., with a current node v as starting nodes, into the entries for each the dictionary. The procedure cover_active_targets corresponds to the scenario where a current node is included into a set of selected nodes, where the procedure adds the count from the dictionary of uncovered targets into the sum of covered targets n. Finally the procedure filter targets discards entries in one or more dictionaries with associated with an h$_{end}$ no more than the height of current node. Pseudo-code for each of the four procedures are detailed below as Algorithms 2-5.

---

Algorithm 2
sum_from_children (i, l$_{j1}$, l$_{j2}$, . . . , l$_{jK}$)

---

1:   for possible key in l.dict$_L$ do
2:     l.dict$_L$[key] = $\Sigma_{k=1}^{K}$ l$_{jK}$.dict$_L$ [key]
3:   for possible key in l.dict$_{PL}$ do
4:     l.dict$_{PL}$ [key] = $\Sigma_{k=1}^{K}$ l$_{jk}$.dict$_{PL}$ [key]
5:   for possible key in l.dict$_{NL}$ do
6:     l.dict$_{NL}$[key] = $\times_{k=1}^{K}$ l$_{jk}$.dict$_{NL}$ [key]
7:   l.n = max$_{k=1}^{K}$l$_{jk}$.n
8:   for continuous lineage column c with start node being i and end value being end do
9:     continuous_lineage_dict[end]++
10:   return l

---

Algorithm 3
add_new_targets (l, v)

---

1:   for lineage target whose o$_{start}$ is current node v do
2:     h$_{end}$ ← h$_{end}$ of the target
3:     l.dict$_L$[(v, h$_{end}$)] ← l.dict$_L$[(v, h$_{end}$)] + 1
4:   for partial lineage target whose o$_{start}$ is current node v do
5:     h$_{end}$, S ← h$_{end}$, source coverage of the target
6:     l.dict$_{PL}$[(v, h$_{end}$, S)] ← l.dict$_{PL}$[(v, h$_{end}$, S)] + 1
7:   for non-lineage target whose o$_{start}$ includes current node v do
8:     id ← id of the target

---

Algorithm 3
add_new_targets (l, v)

---

9:     if l.dict$_{NL}$[id] ≠ 1 then
10:       l.dict$_{NL}$[id] = 1
11:   return l

---

Algorithm 4
cover_active_target (l, v)

---

1:   for key in l.dict$_L$ do
2:     l.n ← l.n + l.dict[key]
3:     l.dict$_L$[key] ← 0
4:   for key in l.dict$_{PL}$ do
5:     (o$_{start}$, h$_{end}$, S) ← key
6:     if v ∈ S then
7:       l.n ← l.n + l.dict$_{PL}$[key]
8:       l.dict$_{PL}$[key] ← 0
9:   for key in l.dict$_{NL}$ do
10:     id ← key
11:     if v can describe the target of id then
12:       l.dict$_{NL}$[key] ← 0
13:       l.n ← l.n + 1
14:   return l

---

Algorithm 5
filter_targets (l, v)

---

1:   for key in dict$_L$ do
2:     (o$_{start}$, h$_{end}$) ← key
3:     if h$_{end}$ ≤ height of v then
4:       l.dict$_L$[key] ← 0
5:   for key in dict$_{PL}$ do
6:     (o$_{start}$, h$_{end}$, S) ← key
7:     if h$_{end}$ ≤ height of v then
8:       l.dict$_{PL}$[key] ← 0
9:   for key in dict$_{NL}$ do
10:     id ← key
11:     if h$_{end}$ for the target of id ≤ height of v then
12:       l.dict$_{NL}$[key] ← 0
12:   return l

---

Pseudo-code for implementing the determination of the CSSHC via the dynamic programming approach is provided below as Algorithm 6.

---

Algorithm 6
Optimal tree pruning with height constraint
((V, E), C, d: V → 2$^C$, H, ≥$_{CSSHC}$)

---

1:   for node v with node height 0 do
2:     T ← add_new_target(v)
3:     CSSHC ← filter_target(T, v)
4:     STS(v, 0) ← {CSSHC}
5:     for height constraint h = 1...H do
6:       T ← add_new_target(v)
7:       T ← cover_active_target(T, v)
8:       CSSHC ← filter_target(T, v)
9:       STS(v, h) ← {CSSHC}
10:   for stage from 0 up to the height of the original tree do
11:     for node v with node height stage do
12:       S = ∅
13:       {u$_1$, u$_2$, ..., u$_{k_v}$} ← children of v
14:       for height constraint h = 0...H do
15:         for combination (CSSHC$_1$, CSSHC$_2$,...CSSHC$_{k_v}$) ∈ STS(u$_1$, h) × STS(u$_2$, h) ... × STS(u$_{k_v}$, h) do
16:           T = sum_from_children (
17:           CSSHC$_1$, CSSHC$_2$, CSSHC$_{k_v}$)
18:           T = add_new_target(T, v)
19:           CSSHC ← filter_target(T, v)

```
Algorithm 6
Optimal tree pruning with height constraint
((V, E), C, d: V → 2^C, H, ≥_CSSHC)

20:                    S ← S ∪ CSSHC
21:             if h > 0 then
22:                    for combination (CSSHC_1,
CSSHC_2,...CSSHC_{k_v}) ∈ STS(u_1, h − 1) × STS(u_2, h − 1) ... × STS(u_{k_v},
h − 1) do
23:                            T = sum_active_targets(
24:                                CSSHC_1, CSSHC_2, ... , CSSHC_{k_v})
25:                            T = add_new_target(T, v)
26:                            T = cover_active_targets(T, v)
27:                            CSSHC ← filter_targets(T, v)
28:                            S ← S ∪ CSSHC
29:             STS(v, h) ← {l|l ∈ S, ∄ l_1 ≠ l, l_1 ≥_CSSHC l}
30:    return {l | l ∈ STS(root of original tree, H), l has maximum
number of covered targets}
```

In general, the process begins by initializing the base case for induction for the leaf nodes: since there is no children nodes for them, the process skips step (1), and performs the remaining steps according to the induction rule for a single CSSHC as described above. The resulting STS will thus be one single CSSHC as shown in lines 1-9 of Algorithm 6. Lines 10-29 of Algorithm 6 represent the main induction loop, where an STS is obtained for each node and for each height constraint in a bottom-up fashion.

For the induction on each node v with height constraint h, the process first obtains the children node $\{u_1, u_2, \ldots, u_{k_v}\}$, where $k_v$ is the number of children for node v. Thereafter, for each possible CSSHC combination from STS from children node under the same height constraint, the process performs CSSHC induction according to a scenario where the current node is not included in the CSSHC (lines 15-20 of Algorithm 6). For each possible CSSHC combination from STS from children node under a height constraint of h−1, the process performs CSSHC induction according to the scenario where the current node is included in the CSSHC (lines 22-28 of Algorithm 6).

After gathering a solution set S, the workflow of Algorithm 6 determinatively selects those that are "high quality" (e.g., selected using Algorithm 5 as shown in line 27). After the induction is performed, the process selects a CSSHC by picking one from the STS of the root node with the maximum number of targets covered. In one embodiment, the selected CSSHC is stored as the concept tree 236. The final reduced tree can then be recovered by either including it as part of an induction data structure or by performing a standard dynamic programming backtracking as known to one of ordinary skill in the art.

In one embodiment, Algorithm 6 is implemented by the table corpus process server 122. Additionally, and/or alternatively, Algorithm 6 is implemented through parallel processing as the computation in each "for" loop can be assigned to various computing devices and executed simultaneously. Accordingly, this disclosure proposes that the foregoing dynamic programming approach generates an optimal solution.

To prove this hypothesis, one only needs to prove that the optimal reduction method will remain in the solutions from the root nodes. As the overall optimal solution for the "forest" is derived from the optimal solution for each tree, this disclosure only addresses the optimal solution for each of the individual trees. For each single tree, the solution for the whole tree comes from the root node, which, in turn, comes from a sub-solution from each of the sub-trees from each of its child nodes, and so forth. This proof uses induction from a leaf node up to the root node to prove that the optimal solution remains in the solution. Assuming that the solution from the child nodes contain the optimal solution, then the optimal solution for the current node will exist in the combination of all such child nodes. Moreover, these solutions will not be discarded during the skyline operation because they will not be dominated by other solutions, as shown in the domination specification. As known to one of ordinary skill in the art, a skyline query is usually defined as: Given a set of points $p_1, p_2, \ldots, p_N$, a skyline query returns a set of points P (referred to as the "skyline points"), such that any point $p_i \in P$ is not dominated by any other point in the dataset.

That is, the optimal solution will remain in the overall solution to the forest and since the optimal solution takes the form of a single count of the covered columns, it will be the maximum solution among all solutions that remains; thus, the optimal solution will be selected as the outputted solution.

In empirical testing, the disclosed table corpus processing server 122 performed the foregoing algorithms on a large enterprise domain relational table corpus having 3,221,412 table columns, which yielded 13,531,269 distinct entities and 2,073,001,771 edges in a resulting entity co-occurrence graph. The entities of the domain relational table corpus contained domain specific concepts related to company products, facilities and business operations. Additionally, the disclosed table corpus processing server 122 developed an open domain relational table corpus obtained from analyzing electronically available documents (e.g., one or more webpages from a given domain), which resulted in 159,571 table columns, having 12,243,887 distinct entities and 13,347,117,422 edges in the entity co-occurence graph. The concepts of this open domain relational table corpus related to culture, economy, astronomy, and other such concepts. One example of a suitable domain from which to build this open domain relational table corpus is Wikipedia, but other such large-scale domains are also possible. The dataset obtained from the enterprise is referred to herein as "Enterprise" and the dataset obtained from the online domain as "Web."

The table corpus processing server 122 implemented a clustering approach for grouping similar table values together based on their co-occurrence graph. In one embodiment, the candidate cluster module 218 is configured to perform this process. In this process, all the highly similar table value pair are merged into the same or similar concepts. One implementation for performing this clustering is a parallel implementation, which is discussed in Rastogi. In the empirical testing of the foregoing algorithms, different clustering approaches were also tested for comparison. These different clustering approaches included the WEBSETS approach, a parallel correlation clustering approach, a density clustering approach, and a complete linkage clustering approach.

The WEBSETS approach is discussed in the non-patent literature reference Dalvi et al., "Websets: Extracting sets of entities from the web using unsupervised information extraction," In *Proceedings of the fifth ACM international conference on Web search and data mining*, pages 243-252, ACM 2012 ("Dalvi"), the disclosure of which is hereby incorporated by reference in its entirety. The WEBSETS approach emits, for each table, a set of consecutive triplets of entities and then merges the triplets together if they have significant overlap in terms of entities they contain and columns they appear in. In one embodiment, the table corpus processing server 122 may be configured to implement the WEBSETS approach, such as by configuring one or more of the modules 208.

The parallel correlation clustering approach is discussed in the non-patent literature reference Chierichetti et al., "Correlation clustering in mapreduce," In *Proceedings of the 20th ACM SIGKDD international conference on Knowledge discovery and data mining*, pages 641-650, ACM 2014 ("Chierichetti"), the disclosure of which is hereby incorporated by reference in its entirety. This table corpus processing server 122 was configured to execute on the entire co-occurrence graph for both datasets (e.g., the Enterprise dataset and the Web dataset). This approach focuses on sampling, among all nodes, a number of pivots and then "grows" clusters around them in each round of clustering.

A density clustering approach, such as DB-SCAN, is another clustering variant that is robust against noise nodes. The DB-SCAN density clustering approach was implemented using a map-reduce programming paradigm: at each round of clustering, a reduce operation was performed on each node to compute the density and neighborhood size to determine whether it is a "core" node or an "edge" node. Through iteration, a reachable region was found for each core and a merge was then performed. One influential parameter in this approach is a minPts variable, which defines the minimum size of the cluster. Since many natural concepts are associated with a small size, e.g. six continents of the world, a value of "five" was used for the minPts variable. Again, this method uses a threshold similarity parameter to determine similarity between concepts.

Finally, a complete linkage clustering approach was implemented, where a pair of clusters merge only when all constituent nodes are similar enough to each other.

The disclosed approach, also referenced as "Concept Construction from Coherent Clusters" (C4), was evaluated with the following settings. In the first stage of clustering, a hierarchical clustering was executed for 20 distributed rounds, resulting in a candidate concept tree with a height of 20. In the second tree pruning stage, a tree pruning dynamic programming was executed with a height constraint of one and three. Depending on whether pruning was not performed or performed with a height constraint of one or three, this approach creates three types of methods: C4 with Height 1 Pruning, C4 with Height 3 Pruning, and C4 without Pruning. One influential parameter in this approach is "described" threshold value, which indicated whether a given tree node could describe a corresponding column in the table corpus.

In evaluating this approach, 100 "ground truth" concepts were labeled in the Enterprise dataset and 60 "ground truth" concepts were labeled in the Web dataset. The ground truth concepts were labelled according to the following procedure: Some table columns were identified that were close to real concepts, and then three to five "seed entities" were then manually selected from those that truly belong to the concept. These seed entities were then used to further retrieve columns in the same concept for which they are members, and then these were finally merged all these columns together removing noises (e.g., data unrelated to the concept) such as the "row label", "total", "sum" etc. Example ground truth concepts for the Enterprise dataset included such concepts as "Profit Center," "Service Office," "Data Center," and "Windows Protocol." Example concepts for the Web dataset included such concepts as "Zodiac Sign", "Chemistry Element Symbols", "Ivy League University", and "Currencies Codes."

For measuring accuracy, the F-score was adopted as a standard metric, which summarizes both the precision and recall. More specifically, for each ground truth concept, all the concepts generated by method of interest were searched and scored, and the one with the highest F-score was selected as the F-score on that specific ground truth concept.

Figure 6:
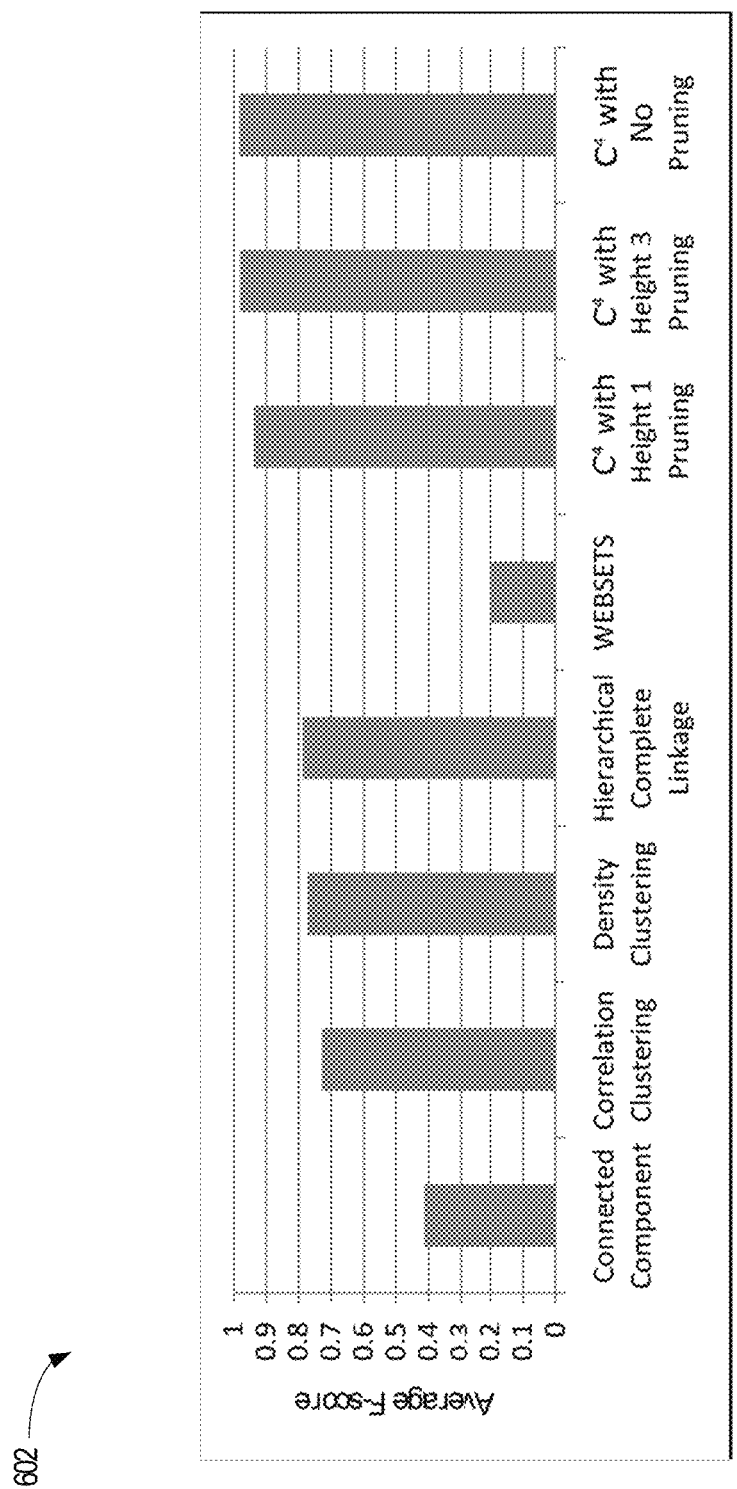
FIG. 6 illustrates a bar chart demonstrating the aggregated performance comparison for the Enterprise dataset, in accordance with an example embodiment.

FIG. 6 illustrates a bar chart 602 demonstrating the aggregated performance comparison for the Enterprise dataset, in accordance with an example embodiment. The bar chart 602 shows the performance of different methods based on a grid search of best parameter settings. From observation, one will note that even if the tree is restricted to a height of one (e.g., a flat set of clusters), it still significantly outperforms other baseline methods. Furthermore, a tree reduction with a height of three gains a major performance boost and is able to recover the original tree and capture most of the ground truth concepts. This performance indicator confirms a suspicion that having a few levels of hierarchy in the output concepts helps, but an over-complicated tree with too many levels of hierarchy does not meaningfully contribute to the performance.

Figure 7:
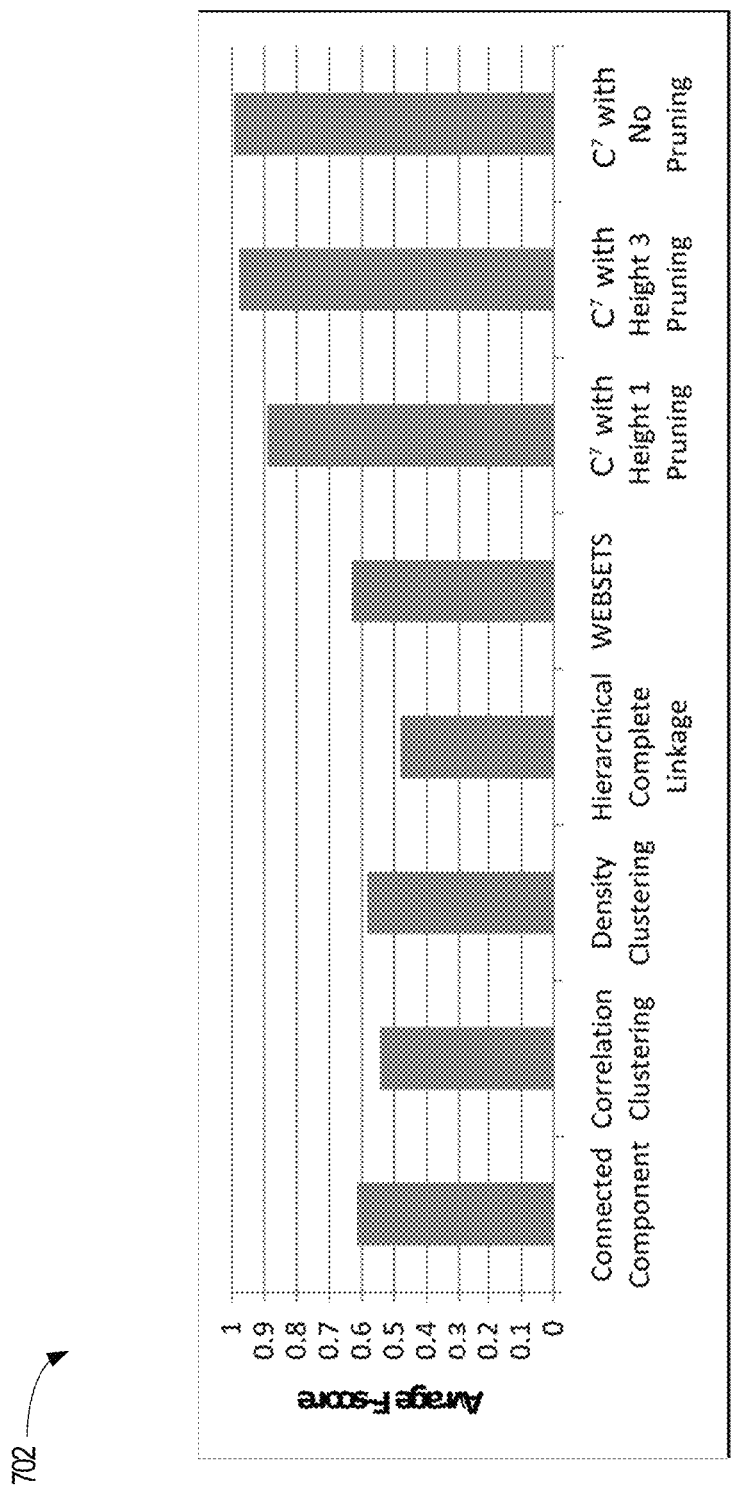
FIG. 7 illustrates a bar chart demonstrating the results for a Web dataset, in accordance with an example embodiment.

FIG. 7 illustrates a bar chart 702 demonstrating the results for the Web dataset, in accordance with an example embodiment. The bar chart 702 displays similar results for the Web dataset as for the Enterprise dataset: a tree reduction with a height of one significantly outperforms other baseline methods. There is more gain in performance for a height three tree reduction compared against a height one tree reduction, as well as that between an original tree and a height three tree, showing that in the Web dataset there is more complex concept hierarchies. It is further worth mentioning that the WEBSETS method, originally designed for use in web tables, has a more reasonable performance compared to the Enterprise dataset. It is hypothesized that this is because WEBSETS tend to merge entities together into concepts only when the table is very consistent in sequential manner, which occurs more often in tables designed for HTML webpages.

Figure 8:
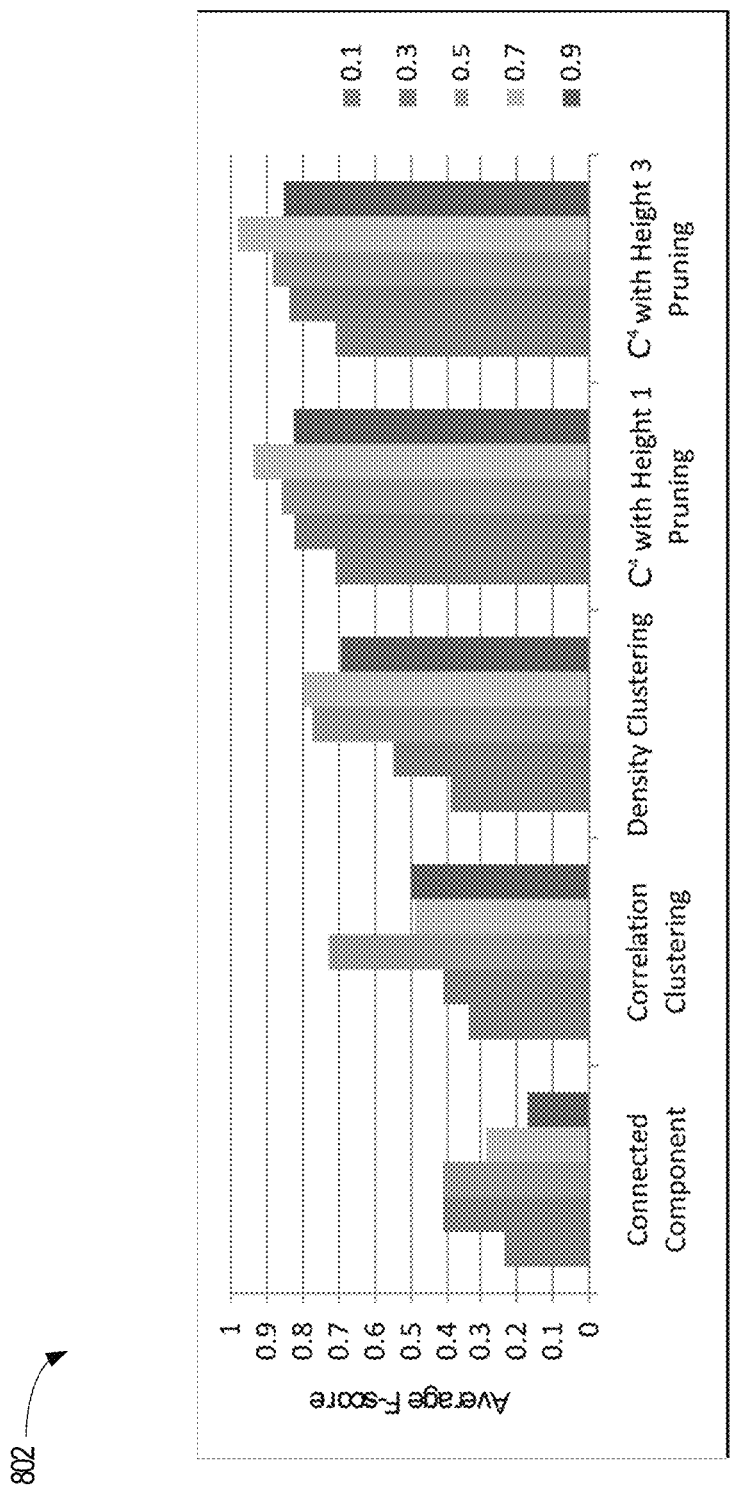
FIG. 8 illustrates a bar chart demonstrating the performance of various approaches under different parameter settings for an Enterprise dataset, in accordance with an example embodiment.
Figure 9:
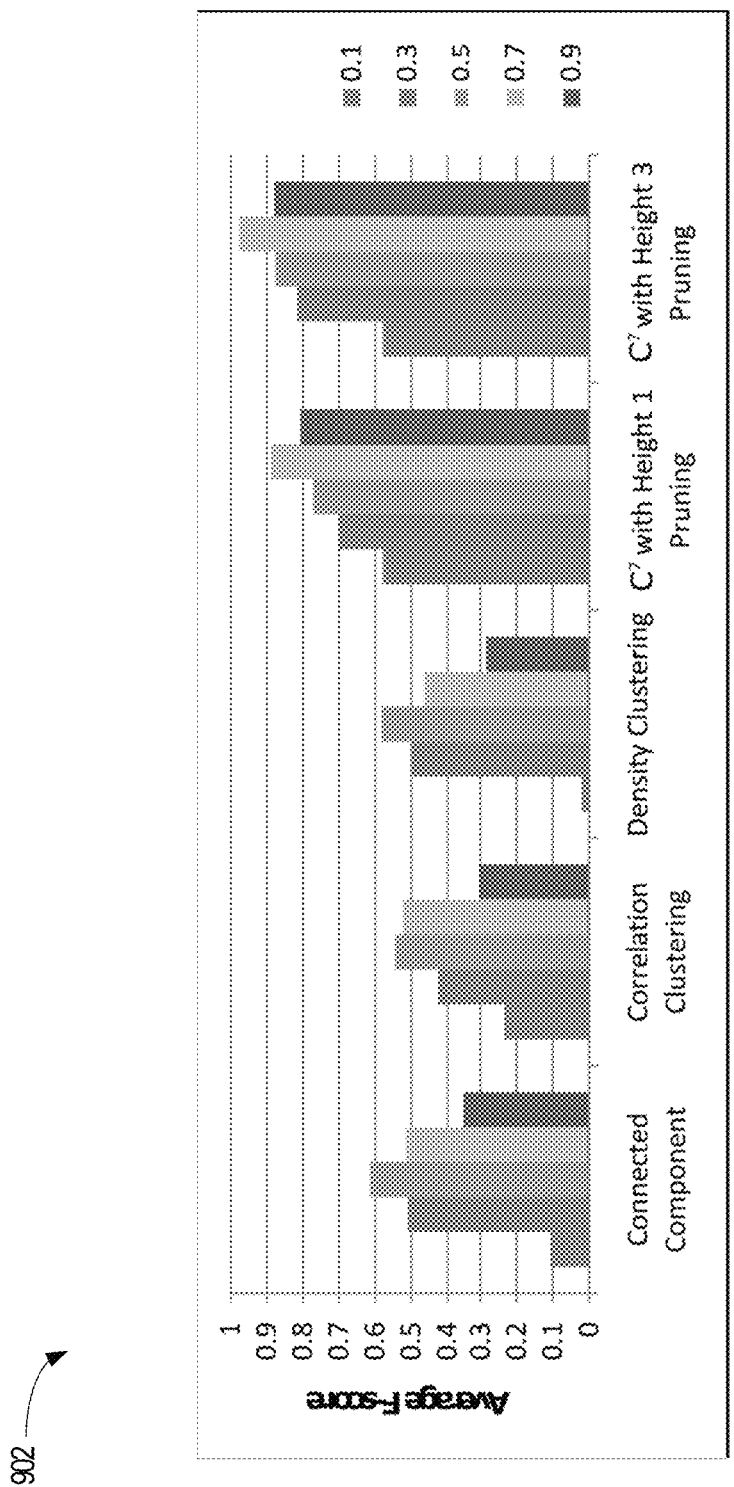
FIG. 9 illustrates a bar chart demonstrating the performance of various approaches under different parameter settings for a Web dataset, in accordance with an example embodiment.

FIG. 8 illustrates a bar chart 802 demonstrating the performance of various approaches under different parameter settings for the Enterprise dataset, in accordance with an example embodiment. FIG. 9 illustrates a bar chart 902 demonstrating the performance of various approaches under different parameter settings for the Web dataset, in accordance with an example embodiment. The bar charts 802, 902 illustrates that establishing the "describing" threshold value to about a Jaccard index threshold of 0.7 appears to be a reasonable choice to approximate match a concept node to a table column in the corpus. For the methods of the Connected Component, Correlation Clustering, and Density Clustering, setting a similarity threshold on value co-occurrence similarity of 50% appears to yield favorable results.

The disclosed concept tree 236 can be leveraged in various ways in manipulating and/or analyzing data sets given a table corpus (e.g., one or more table values 222 and/or one or more spreadsheet values 224). For example, the concept tree 236 may be used to identify column and node correlations. More specifically, given a particular column from a table corpus, the concept tree 236 can be traversed to identify a node that represents the particular column. In one embodiment, this approach may be performed by comparing the values associated with each node in the concept tree 236 and the values with the particular column, and then selecting the node that has the greatest number of values appearing in the particular column.

In another example, the concept tree 236 may be used to enhance, or otherwise modify, the analysis performed by a pivot table using one or more table values 222 and/or one or more spreadsheet values 224 appearing in the table corpus. For example, the concept tree 236 may be used to suggest or offer ways in which to rollup the values appearing in the presented pivot table. The suggestion may be performed by if the pivot table is currently showing sales by the State dimension, then the system can find the closest node in the concept hierarchy that contains all state values in the pivot table. This approach may be considered as the least common ancestor (LCA) of all of the state values. There may be nodes in between the state values and the node State, namely, such as "NW States," "SW States," and other such categories of states. By traversing upwards from the values to higher levels of the tree, the system can find interesting rollups. In this implementation, not all values can or need to be rolled up; for example, only a subset (e.g., where the pivot table contains all of the NW State values (WA, OR, ID) and the state TX; the system could either suggest just rolling up WA, OR, ID to NW and leave TX as is, or it could also roll TX up to SW States; in other words, the system rolls all the values up to a single level in the tree, or possibly some other frontier of the tree that has a mixture of levels). In this example, all values have a LCA, namely, the root.

The user friendly names for the nodes in the hierarchy can be taken from column names of the underlying corpus columns containing the values of the node. They may also be annotated.

A related alternative is that given a user column of state names, the system can be instructed to "join" a new column containing the state region by using the hierarchy. Then, the system builds the pivot table over the region. One or more users may manually edit the newly added region column on as-needed basis.

Yet another alternative approach, is to start with a column of state names, select a single state using a human interface device (e.g., a keyboard and/or mouse), say the word "rollup" using an audio input device (e.g., a microphone), and the selection then traverses upwards in the tree from all nodes containing that value. The operations then stop at the next node that contains at least one additional value in the column. If a user then adds in other nodes (e.g., using the human interface device), the user may "cluster" these values to the next higher node and then include any other values in the column contained by that node. The system then provides provide a further option to rollup all remaining values in the column to the same hierarchy level as the currently selected cluster, thus clustering the remaining unclustered (un-rolled-up) values.

In yet a further example, the concept tree 236 may be used to identify related columns and/or tables appearing in the table corpus. In this example, columns may be related depending on the number of values appearing in a given column and the values associated with a given node of the concept tree 236. In one embodiment, a first pass is performed that identifies those nodes which correspond to the columns of the table corpus. Given a plurality of nodes from the concept tree 236, a node may be determined as representing a particular column where the node includes a maximum number of values from the particular column. Thus, for each node in the plurality of nodes, a corresponding column is identified. Furthermore, node-column associations may be stored in the machine-readable memory 206 (or other suitable machine-readable memory). The node-column associations may then be traversed to identify which node each column belongs to. Columns that share a given node may then be determined as "related" columns. This analysis may be extended further by identifying the table in which a given column appears, and then storing an association of a table, column, and node. Thus, different tables can be determined as being related where the tables are associated with the same nodes selected from the plurality of nodes. A related node threshold may also be established that indicates when tables are to be determined as being related (e.g., one or more nodes in common, two or more nodes, three or more nodes, etc.). The related node threshold serves as a mechanism to filter out those instances where the tables may only have one node in common. The related node threshold may be further customizable such that a user or other operator can manipulate the related node threshold to increase or decrease it accordingly.

In addition, the concept tree 236 may be used in the performance of the auto-completion of text having been entered in a displayed text field. The text field may be associated with a dictionary of words which, when a user enters one or more letters into the text field, one or more words are displayed having the typed characters in common. Additionally, and/or alternatively, the text field may be configured such that, when the user enters one or more words from the dictionary, the user may be prompted as to whether additional words from the dictionary should be populated into the text field. In one embodiment, the dictionary associated with the text field is populated with values selected from one or more nodes of the concept tree 236. A developer or other programmer may select which one or more nodes are associated with the dictionary and/or displayed text field. Further still, the displayed text field may include a graphical element, such as a radio button or other graphical element, that allows the user to select which level in the concept tree 236 that should be used to populate the dictionary of the displayed text field. For example, as a user types one or more characters from a geographical state, or one or more words corresponding to one or more geographical states, a prompt may be displayed that queries whether the user would like to auto-complete the text field with values (e.g., states) associated with the node used to populate the dictionary associated with the displayed text field.

In yet another example, the concept tree 236 may be used to identify outlier values within a particular column. In one embodiment, this example may be performed by finding the covering of nodes that gives the minimum description length (MDL) of the values in the column. In one embodiment, MDL is defined as the total cost of describing the values in the column in terms of nodes in the tree. If the column contains all NW states and all SW states and New York, the cost may be "three" if the nodes include those for NW states and SW states. An alternative approach is to describe the column with the node States, and this approach further includes describing describe the states in State that are not in the column in order to precisely describe the values in the column. For outliers, the system may identify the smaller clusters.

In yet a further approach, the disclosed system may compute the MDL in terms of the probability of a column value being part of that node. This probability could be computed based upon the frequency with which the value occurs in the underlying corpus columns comprising that node. Alternatively there could be a minimum threshold for the number of times the value occurs in terms of being present in some fraction of the underlying corpus columns for that node. In this further approach, the higher the probability, the lower the MDL cost. This approach may also be performed by analyzing the pairwise LCA distance between every pair of column values and then identifying those values that exceed the average distance.

In a further example, one or more labels may be assigned to the plurality of nodes included in the concept tree 236. Each of the labels may be unique so as to identify a corresponding node in the plurality of nodes. The label may further identify a category or concept that the node represents. In one embodiment, the name for the label is assigned by a user that interacts with the concept tree 236. In another embodiment, if a node maps to predetermined column threshold number, such as 10 columns that each have column names, the system selects the most frequent (or longest) column name as the node name. Additionally, and/or alternatively, the system may concatenate the child node names for the parent. Further, the system may be configured to identify the common/frequent substring between all the children (e.g., (NW States, SW States, SE States)=>States).

The system may also be configured to select names that satisfy a predetermined condition or plurality of conditions (e.g., no non-alphanumeric characters, names less than (or greater than) a predetermined length, etc.). If the parent node is assigned a name that satisfies the one or more predetermined conditions, but the children nodes do not have names that satisfy such conditions, the system is configured to assign one or more of the children nodes with the name of the parent node with some additional child identifier(s) (e.g., States=>(States_1, States_2, States_3)). Further still, the level in the hierarchy might be added to the name, e.g., Node_L5_PFoo_C1, which corresponds to a hierarchical level five, a parent node with the name of "Foo," and that the node is the first child node.

In addition, the table corpus processing server 122 may maintain an array, linked list, or other data structure for each node of the plurality of stores, where the data structure stores each of the column names from where the table values 222 and/or spreadsheet values 224 for a corresponding node were obtained. The name for the node label may be exposed through an API or other programming interface such that a user may reference the node label by the node label name. In this manner, the user may perform various operations on the columns of the table corpus by referencing the node label names that are associated with the columns. For example, where the plurality of nodes represent geographical regions (e.g., cities, states, groups of states, etc.), the user may use a command to delete and/or highlight all rows and/or columns of the table corpus that have values associated with a node label of "NW States."

In additional example, the concept tree 236 may be used to perform operations on one or more tables that have columns associated with the nodes of the concept tree 236. For example, suppose that a first node $N_1$ is associated with a table $T_1$ and a second node $N_2$ is associated with a table $T_2$. In this regard, the association may be established where table $T_1$ has one or more columns whose values are covered by the first node $N_1$ and where table $T_2$ has one or more columns whose values are covered by the second node $N_2$. Further suppose that a node $N_3$ is a parent node of both node $N_1$ and node $N_2$; in other words, that node $N_3$ represents a more abstract or general concept than node $N_1$ or node $N_2$. In this example, table $T_1$ may be joined with table $T_2$ even though table $T_1$ and table $T_2$ do not share an equi-join key. As a more specific example, suppose table $T_1$ has values that are city names and table $T_2$ has values that are ZIP codes. In this specific example, further suppose that node $N_3$ represents the concept of "State." Using this hierarchy, table $T_1$ could then be joined with table $T_2$ to analyze the combined data by "State".

By storing the columns names and their association with nodes of the plurality of nodes that form the concept tree 236, a user can explore how the columns of the table corpus may be related. In one embodiment, when a user requests to view a particular column (associated with a current node), the user may be presented with one or more options, via a graphical user interface, that allow the user to display "sibling columns" (e.g., columns associated with nodes that are child nodes of the current node's parent node), "a parent" column (e.g., one or more columns associated with nodes that are parent nodes of the current node), a "grandparent" column," one or more "child" columns (e.g., columns associated with nodes that are child nodes of the current nodes), "grandchild" columns, and so forth. As known to one of ordinary skill in the art, the graphical user interface may be implemented using one or more computing programming and/or scripting language that leverages a library for drawing trees, such as jsTree, which is a jQuery plugin, which may be used where the access to the concept tree 236 is via a web-based client application.

The concept tree 236 may also be leveraged to indicate which nodes of the plurality nodes may cover a given column from the table corpus. For example, as the table corpus processing server 122 is building the concept tree 236 via one or more of the algorithms discussed above, the table corpus processing server 122 may display the label names of nodes that cover (e.g., include one or more values from) the given column. Additionally, and/or alternatively, where the concept tree 236 has already been constructed, the values for the given column may be inserted into the concept tree 236, whereby the table corpus processing server 122 may then also display the nodes that cover the column being inserted. In this manner, the user can visually see which nodes of the concept tree 236 may describe the values of the column being inserted.

The concept tree 236 may be further leveraged in identifying columns (or the tables and/or spreadsheets that include the identified columns) that may have values that could be children of values for a given column. As discussed above, the table corpus processing server 122 may maintain a data structure (e.g., an array, linked list, etc.) for each of the nodes of the concept tree 236, where the data structure identifies the columns, tables, and/or spreadsheets whose values are covered (e.g., contained or represented by) by a corresponding node. By traversing edges for a given node, the table corpus processing server 122 identifies the parent and/or child nodes of the given node; thus, the table corpus processing server 122 also identifies the associated columns, tables, and/or spreadsheets. Using this paradigm, a user can submit a column to the table corpus processing server 122, which then identifies and/or constructs one or more nodes, to cover the values of the submitted column. Using an API or other programming interface that exposes the concept tree 236, the user can then request that the table corpus processing server 122 identify columns and/or spreadsheets whose values are associated with child nodes of the node associated with the submitted column. These operations may be employed where the user desires to find a first set of values, such as "City Names," that are subsets of another set of values, such as "State Names." The converse is also possible, where the user desires to find values that are the superset (e.g., "State Names") of a given subset of values (e.g., "City Names"). In this manner, the user can locate particular spreadsheets, as identified by the table corpus processing server 122, that may have values that are subsets or supersets for a given set of values.

In yet a further example, the concept tree 236 may be used for keyword search expansion and/or generalization. In one embodiment, the table corpus processing server 122 (or other computing platform having access to the concept tree 236), uses the superset/subset approach described above to present values associated with nodes that are sibling nodes, parent nodes, and/or child nodes for a given node. For example, where a text field is presented for a user to enter text to use as keywords for a search, the table corpus processing server 122 may initially identify one or more nodes that cover the value(s) represented by the entered text. Thereafter, the table corpus processing server 122 may then identify child nodes, parent nodes, and/or sibling nodes, by traversing the edges of the identified one or more nodes. The table corpus processing server 122 may then present the values covered by the child nodes, parent nodes, and/or sibling nodes as suggestions to be used as values for the text field.

If a user is doing keyword search over a corpus of tables, the user may search for "NW States" in the hope of finding a spreadsheet that is specific to this topic. In some instances, the phrase "NW States" may not match many (or any) spreadsheets. However, if the values of the node "NW States" was expanded, there may be many spreadsheets containing states that are "NW States" (e.g., WA, OR, ID) in a single column. The converse is also possible; if the query had multiple keywords "WA, OR" the system can also help the user find spreadsheets pertaining to these keywords. If too many results are returned (e.g., the search results are greater than a predetermined number of search results), the system can use the hierarchy for a faceted search and show the user nearby nodes in the graph along with how many results they contain. The search engine itself could do the expansion/contraction operation. Although the text box where the search is entered may not be directly updated, search operations occur during the search process.

Although the foregoing examples reference the concept tree 236, one of ordinary skill in the art will appreciate that the table corpus processing server 122 may build one or more concept trees for a given a table corpus or for different segments of the table corpus. For example, a user or other administrator may specify the concept trees that the table corpus processing server 122 is to build using selected set of the table corpus. Further still, where multiple concept trees are available, the table corpus processing server 122 may present an option to a user to select which concept trees to use in performing one or more of the operations of the foregoing examples. Additionally, and/or alternatively, the table corpus processing server 122 may be configured to automatically determine the predicates and/or selection criteria for the underlying table corpus. In this manner, there may be various concept trees stored by the table corpus processing server 122 built upon the union, intersection, difference, etc. of any of the corpora accessible by the table corpus processing server 122.

Figure 10A:
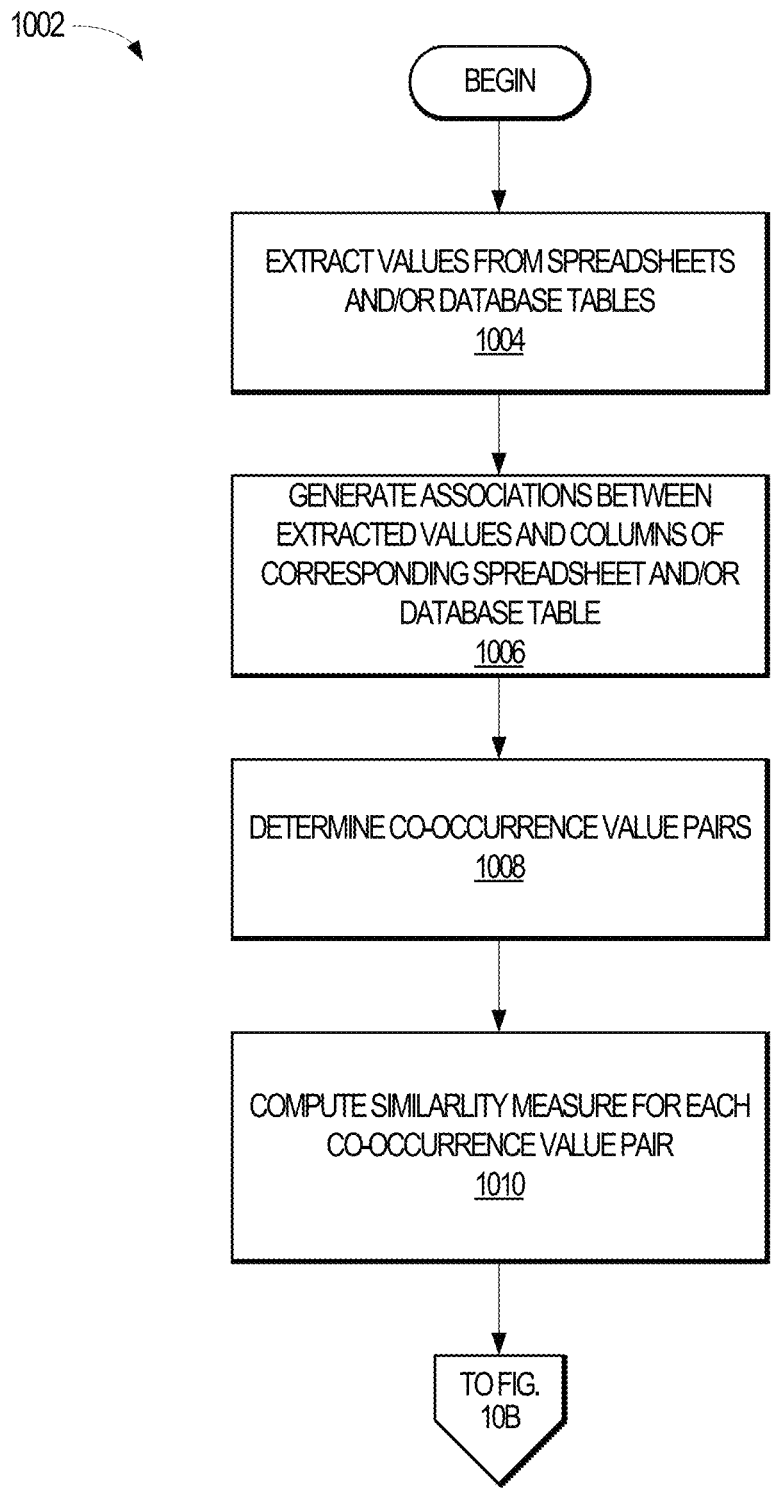
FIGS. 10A-10B are flow charts illustrating a method, in accordance with an example embodiment, for constructing a concept tree from a given table corpus.
Figure 10B:
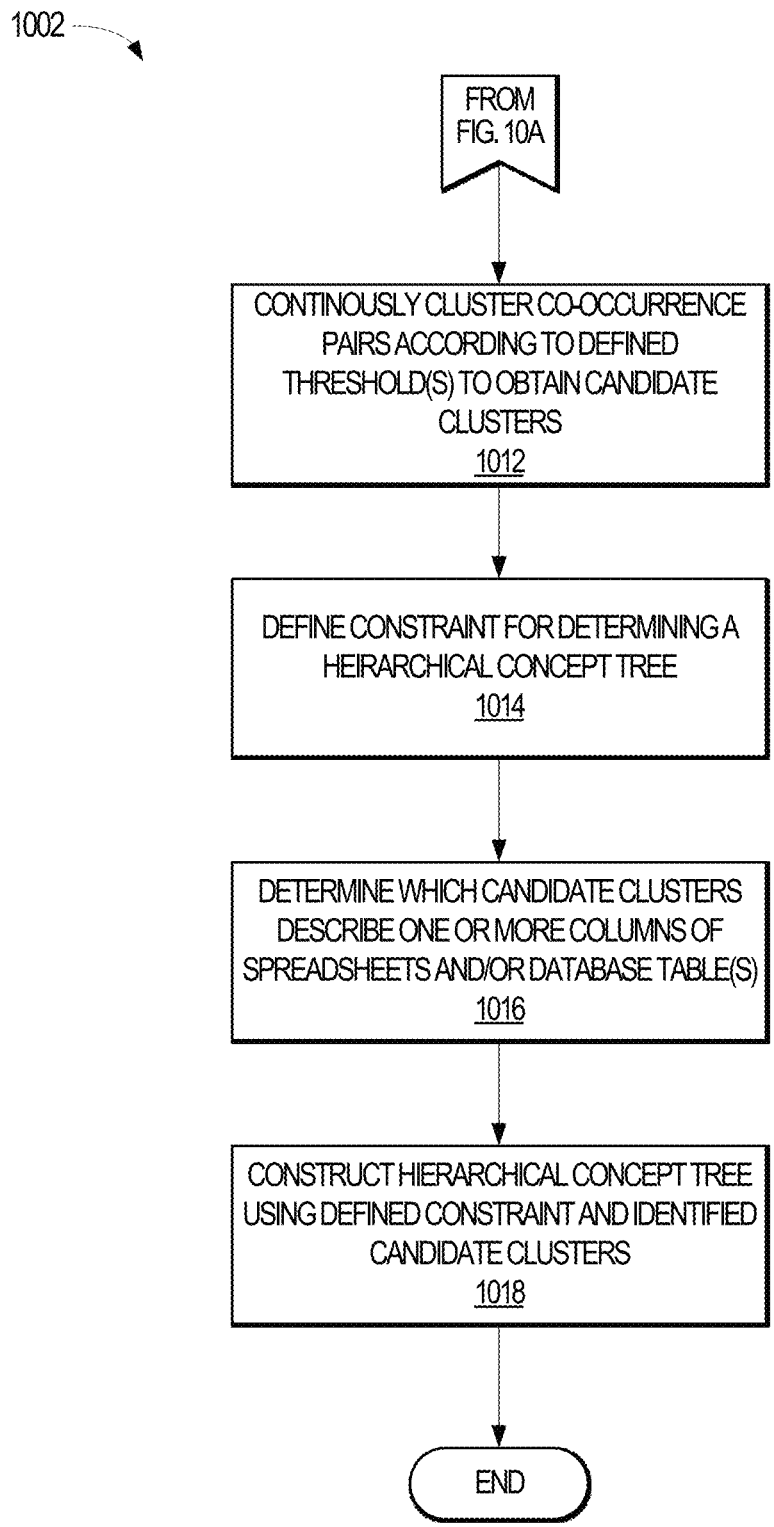

FIGS. 10A-10B illustrate a method 1002, in accordance with an example embodiment, for constructing a concept tree from a given table corpus. The method 1002 may be implemented by one or more modules 208 of the table corpus processing server 122 and, accordingly, is merely described by way of reference thereto.

Initially, table corpus processing server 122 obtains and/or extracts various values from one or more electronic spreadsheet files and/or one or more electronic database tables (Operation 1004). As discussed previously, the table corpus processing server 122 may be configured with a database table retrieval module 212 and/or a spreadsheet file retrieval module 214 to obtain these values. Furthermore, such values may be stored as the table values 222 and/or the spreadsheet values 224.

The table corpus processing server 122 may then generate one or more associations between the values 212-214 and the columns of the corresponding spreadsheet file and/or database table (Operation 1006). In one embodiment, a reference to the column is stored with the table values 222 and/or the spreadsheet values 224. The table corpus processing server 122 then determines one or more co-occurrence value pairs for the table values 222 and/or the spreadsheet values 224 (Operation 1006). In one embodiment, the co-occurrence value pairs include a pairing of each table value 222 and/or each spreadsheet value 224 with every other table value 222 and/or spreadsheet value 224. In this manner, there is a pairing of the table values 222 with each other, a pairing of each table value 222 with each spreadsheet value 224, and a pairing of the spreadsheet values 224 with each other.

The table corpus processing server 122 then computes a similarity measure for each of the co-occurrence pairs determined in Operation 1008 (Operation 1010). In one embodiment, a similarity determination module 216 determines a Jaccard similarity value for each of the co-occurrence pairs, which is then stored in the similarity values The determined Jaccard similarity value may then be compared with a Jaccard similarity threshold value stored in the threshold value 238. The comparison indicates whether a given co-occurrence pair is, in fact, similar. Thus, where the determined Jaccard similarity value meets and/or exceeds the Jaccard similarity threshold value, the corresponding co-occurrence pair is determined to be similar.

Referring next to FIG. 10B, the method 1002 continues by clustering the co-occurrence value pairs into candidate clusters by iteratively comparing one or more of the similarity values 226 with one or more of the Jaccard similarity threshold value(s) 238. As explained above, the candidate cluster module 218 is configured to determine the various candidate clusters 228 through a batch version of agglomerative clustering. In addition, this implementation may be performed as described at Algorithm 1.

Thereafter, the table corpus processing server 122 may define one or more constraints in determining a hierarchical concept tree (e.g., the hierarchical concept tree 236) from the candidate clusters 228 (Operation 1014). In one embodiment, the constraints include a height constraint on the height of the hierarchical concept tree and/or a size constraint on the size of the concept clusters selected from the candidate clusters 228. While FIG. 10B illustrates that Operation 1014 is performed after and/or about the same time as Operation 1012, the various constraints may be determined and/or defined prior to the execution of the method 1002.

The table corpus processing server 122 then selects candidate clusters from the candidate clusters 228, and determines which of the selected candidate clusters "describes" one or more columns of the original table corpus (Operation 1016). As explained above, the table corpus processing server 122 may define a "describe" function d: $O_c \rightarrow C$ to represent, for each candidate cluster node $o \in O_c$ those columns (denoted as c) in the original corpus that are similar to o. Based on the instances contained in c and o, if c and o mostly contains the same elements, concept o can be considered to "describe" the column c, and this relationship may be written as $c \in d(o)$. The table corpus processing server 122 may then select those candidate clusters 228 that are determined as "describing" a given column for inclusion in the final concept tree 236.

The table corpus processing server 122 then constructs the concept tree 236 from the selected clusters 232 and various defined constraints (Operation 1018). As explained previously, the table corpus processing server 122 may implement a dynamic programming approach to determining the concept tree 236 by treating the concept tree 236 as a CSSHC. The dynamic programming approach is outlined in pseudocode via Algorithms 2-6. By treating the concept tree 236 as a CSSHC, the table corpus processing server 122 generates a concept tree 236 having few (or no) redundant clusters (e.g., concept nodes), which results in faster traversals of the concept tree 236 and reduced storage requirements to store the concept tree 236. As the concept tree 236 may include nodes having more than one million distinct values, compressing the concept tree 236 to reduce redundant concept nodes is technically beneficial to improving the performance of the table corpus processing server 122 or any other computing device that may host the concept tree 236 for access by other computing devices.

In this manner, this disclosure provides a technical solution in the form of a concatenated subtree selection with a height constraint to address the technical problem of efficiently representing concepts in enterprise domain data. Through a dynamic programming approach, the disclosed table corpus processing server 122 first generates candidate concepts to capture possible concepts, and then uses a corpus curation approach to perform concept selection from these candidates. As enterprises typically maintain vast amounts of internal knowledge, this disclosure provides an efficient way of organizing such knowledge and providing a traversable concept tree for identifying similar concepts. The disclosed concept tree has multiple uses for search-related platforms, such as query expansion, auto-completion, query suggestion, and keyword identification. By providing the disclosed concept tree 236 via Software as a Service (SaaS) or through a Representational State Transfer (REST) architecture, a search-related platform can easily search and identify concepts within an enterprise domain. Thus, this disclosure provides an inherent technical solution to the technical problem of identifying and organizing enterprise knowledge data, but also provides a technical solution that can be leveraged in other technical fields.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 11:
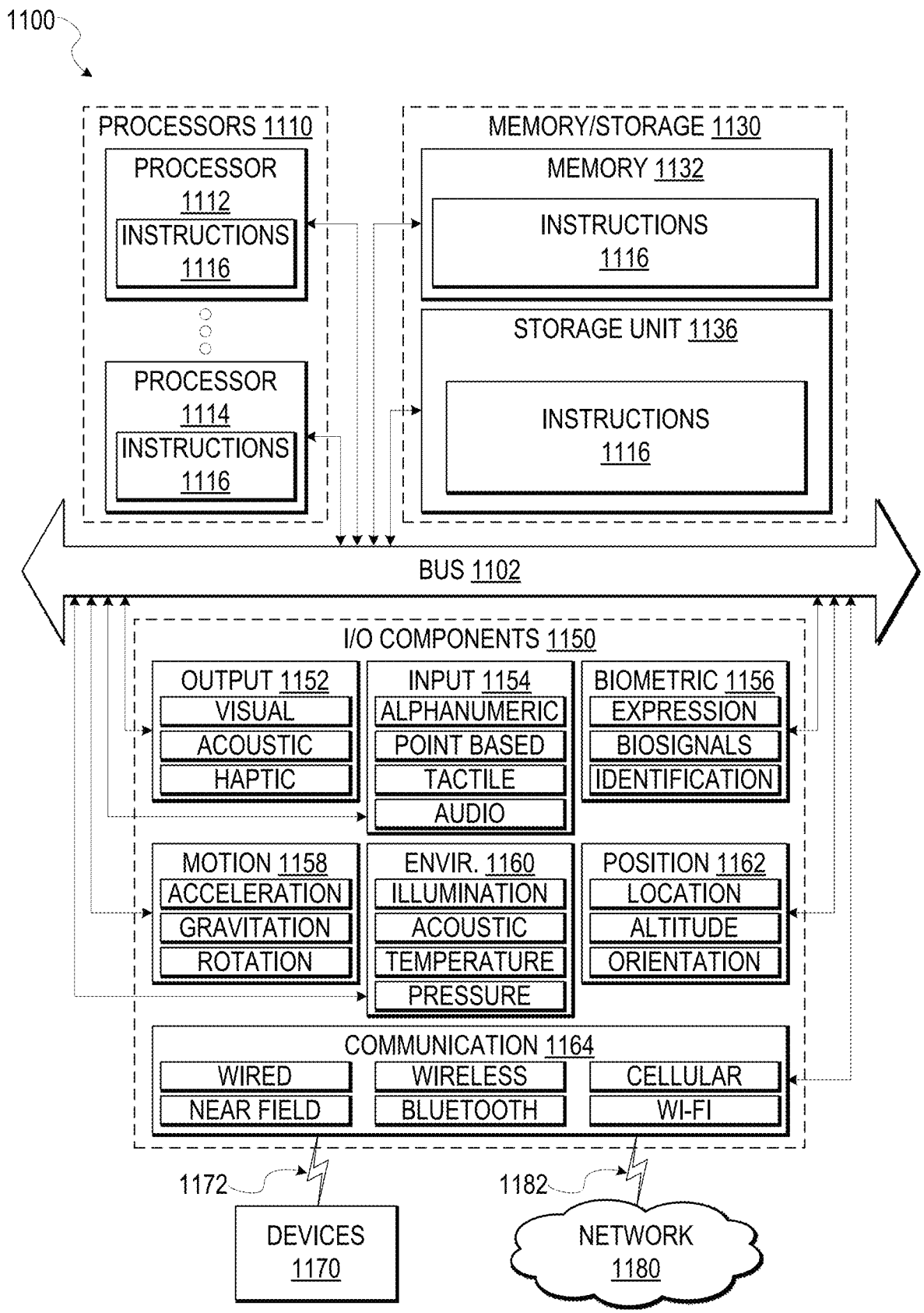
FIG. 11 is a diagrammatic representation of a machine in the example form of a computer system within which a set of instructions for causing the machine to perform any one or more of the methodologies discussed herein may be executed.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute the method 1002 illustrated in FIGS. 10A-10B. Additionally, or alternatively, the instructions 1116 may implement one or more of the modules 212 illustrated in FIG. 2 and so forth. The instructions 1116 transform the general, non-programmed machine into a particular machine programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory/storage 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1112 and processor 1114 that may execute instructions 1116. The term "processor" is intended to include a multi-core processor that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core process), multiple processors with a single core, multiple processors with multiples cores, or any combination thereof.

The memory/storage 1130 may include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of processors 1110 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via coupling 1182 and coupling 1172 respectively. For example, the communication components 1164 may include a network interface component or other suitable device to interface with the network 1180. In further examples, communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 1180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or other type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to devices 1170. The term "transmission medium" shall be taken to include any intangible medium that is capable of storing, encoding, or carrying instructions 1116 for execution by the machine 1100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A system for creating a hierarchical concept tree from a plurality of values obtained from enterprise domain data, the system comprising:
   a machine-readable medium storing computer-executable instructions; and
   one or more hardware processors that, having executed the computer-executable instructions, configures the system to perform a plurality of operations, the plurality of operations comprising:
   obtaining, over one or more networks, the plurality of values stored in columns within a corpus of database tables of the enterprise domain data;
   organizing each of the plurality of values into a plurality of co-occurrence value pairs, each value in each respective co-occurrence pair co-occurs with one another in the corpus of database tables;
   determining a plurality of similarity values, each of the plurality of similarity values indicates, for each co-occurrence value pair, whether values in the co-occurrence value pair are similar to one another;
   clustering the plurality of value pairs based on the plurality of similarity values to obtain a plurality of candidate concept clusters;
   creating a candidate concept tree from the plurality of candidate concept clusters;
   identifying, based on one or more constraints, a subset of the plurality of candidate concept clusters from the candidate concept tree that describes one or more of the columns within the corpus of database tables to obtain a plurality of selected concept clusters; and
   generating the hierarchical concept tree from the plurality of selected concept clusters for search-related platforms of the enterprise domain data over the one or more networks.

2. The system of claim 1, wherein the clustering the plurality of value pairs comprises clustering unique values obtained from the corpus of database tables.

3. The system of claim 1, wherein the candidate concept tree includes a plurality of nodes, each node representing a concept identified from the plurality of values; and
   the plurality of operations further comprise identifying whether a node selected from the plurality of nodes represents at least one column of values selected from the corpus of database tables.

4. The system of claim 1, wherein the candidate concept tree includes a plurality of nodes, each node representing a concept identified from the plurality of values; and
   the plurality of operations further comprise eliminating redundant nodes from the plurality of nodes in generating the hierarchical concept tree from the plurality of selected concept clusters.

5. The system of claim 1, wherein the hierarchical concept tree represents a solution to a concatenated subtree selection with a defined height constraint.

6. The system of claim 1, wherein the clustering the plurality of value pairs comprises iteratively merging the plurality of value pairs to obtain the plurality of candidate concept clusters.

7. The system of claim 1, wherein at least one of the columns of the corpus of database tables is identified as a target type, the target type being selected from a group consisting of a lineage target, a partial lineage target, and a non-lineage target; and
   generating the hierarchical concept tree is based on the target type of the at least one of the columns of the corpus of database tables.

8. A method for creating a hierarchical concept tree from a plurality of values obtained from enterprise domain data, the method comprising:
   obtaining, over one or more networks, the plurality of values stored in columns within a corpus of database tables of the enterprise domain data;
   organizing each of the plurality of values into a plurality of co-occurrence value pairs, each value in each respective co-occurrence pair co-occurs with one another in the corpus of database tables;

determining a plurality of similarity values, each of the plurality of similarity values indicates, for each co-occurrence value pair, whether values in the co-occurrence value pair are similar to one another;

clustering the plurality of value pairs based on the plurality of similarity values to obtain a plurality of candidate concept clusters;

creating a candidate concept tree from the plurality of candidate concept clusters;

identifying, based on one or more constraints, a subset of the plurality of candidate concept clusters from the candidate concept tree that describes one or more of the columns within the corpus of database tables to obtain a plurality of selected concept clusters; and generating the hierarchical concept tree from the plurality of selected concept clusters for search-related platforms of the enterprise domain data over the one or more networks.

9. The method of claim 8, wherein the clustering the plurality of value pairs comprises clustering unique values obtained from the corpus of database tables.

10. The method of claim 8, wherein the candidate concept tree includes a plurality of nodes, each node representing a concept identified from the plurality of values; and the method further comprises identifying whether a node selected from the plurality of nodes represents at least one column of values selected from the corpus of database tables.

11. The method of claim 8, wherein the candidate concept tree includes a plurality of nodes, each node representing a concept identified from the plurality of values; and the method further comprises eliminating redundant nodes from the plurality of nodes in generating the hierarchical concept tree from the plurality of selected concept clusters.

12. The method of claim 8, wherein the hierarchical concept tree represents a solution to a concatenated subtree selection with a defined height constraint.

13. The method of claim 8, wherein the clustering the plurality of value pairs comprises iteratively merging the plurality of value pairs to obtain the plurality of candidate concept clusters.

14. The method of claim 8, wherein at least one of the columns of the corpus of database tables is identified as a target type, the target type being selected from a group consisting of a lineage target, a partial lineage target, and a non-lineage target; and generating the hierarchical concept tree is based on the target type of the at least one of the columns of the corpus of database tables.

15. A machine-readable medium storing computer-executable instructions that, when executed by one or more hardware processors, cause a system to perform a plurality of operations comprising:

obtaining, over one or more networks, the plurality of values stored in columns within a corpus of database tables of the enterprise domain data;

organizing each of the plurality of values into a plurality of co-occurrence value pairs, each value in each respective co-occurrence pair co-occurs with one another in the corpus of database tables;

determining a plurality of similarity values, each of the plurality of similarity values indicates, for each co-occurrence value pair, whether values in the co-occurrence value pair are similar to one another;

clustering the plurality of value pairs based on the plurality of similarity values to obtain a plurality of candidate concept clusters;

creating a candidate concept tree from the plurality of candidate concept clusters;

identifying, based on one or more constraints, a subset of the plurality of candidate concept clusters from the candidate concept tree that describes one or more of the columns within the corpus of database tables to obtain a plurality of selected concept clusters; and generating the hierarchical concept tree from the plurality of selected concept clusters for search-related platforms of the enterprise domain data over the one or more networks.

16. The machine-readable medium of claim 15, wherein the clustering the plurality of value pairs comprises clustering unique values obtained from the corpus of database tables.

17. The machine-readable medium of claim 15, wherein the candidate concept tree includes a plurality of nodes, each node representing a concept identified from the plurality of values; and the plurality of operations further comprise identifying whether a node selected from the plurality of nodes represents at least one column of values selected from the corpus of database tables.

18. The machine-readable medium of claim 15, wherein the candidate concept tree includes a plurality of nodes, each node representing a concept identified from the plurality of values; and the plurality of operations further comprise eliminating redundant nodes from the plurality of nodes in generating the hierarchical concept tree from the plurality of selected concept clusters.

19. The machine-readable medium of claim 15, wherein the clustering the plurality of value pairs comprises iteratively merging the plurality of value pairs to obtain the plurality of candidate concept clusters.

20. The machine-readable medium of claim 15, wherein at least one of the columns of the corpus of database tables is identified as a target type, the target type being selected from a group consisting of a lineage target, a partial lineage target, and a non-lineage target; and generating the hierarchical concept tree is based on the target type of the at least one of the columns of the corpus of database tables.

* * * * *